United States Patent
Murakami et al.

[11] Patent Number: 6,148,118
[45] Date of Patent: Nov. 14, 2000

[54] IMAGE PROCESSING APPARATUS CAPABLE OF REPRODUCING LARGE-SIZED DOCUMENT

[75] Inventors: Hiroshi Murakami; Hideo Kumashiro, both of Toyokawa; Koichi Kamon, Takatsuki, all of Japan

[73] Assignee: Minolta Co., Ltd., Osaka, Japan

[21] Appl. No.: 08/675,485

[22] Filed: Jul. 3, 1996

[30] Foreign Application Priority Data

Jul. 5, 1995 [JP] Japan .................................. 7-194199
Oct. 24, 1995 [JP] Japan .................................. 7-298975
Oct. 25, 1995 [JP] Japan .................................. 7-302016

[51] Int. Cl.$^7$ .................................................. G06K 9/36
[52] U.S. Cl. ........................... 382/284; 382/294; 358/450
[58] Field of Search ................... 358/450, 448; 382/254, 276, 284, 294; 345/435

[56] References Cited

U.S. PATENT DOCUMENTS 4,692,812 9/1987 Hirahara et al. .
5,140,647 8/1992 Ise et al. .................................. 382/284
5,465,163 11/1995 Yoshihara et al. .

FOREIGN PATENT DOCUMENTS 3-182976 8/1991 Japan .
4-331567 11/1992 Japan .

*Primary Examiner*—Thomas D. Lee
*Attorney, Agent, or Firm*—Burns, Doane, Swecker & Mathis, LLP

[57] ABSTRACT

In a method of joining image data divided into a plurality of parts each having an overlap region with the other at a border line portion into a single image for output, an image processing apparatus joins the plurality of partial images having overlap regions L at border line portions. The image processing apparatus extracts a joining line connecting pixels with small density difference between partial images from the overlap region, and joins the partial images with each other along the joining line. The image processing apparatus extracts a line connecting pixels with small density difference with adjacent pixels from the overlap region of the partial images as a joining line upon extracting the joining line. The density difference at the joining border is minimized in order to make the joining line look more natural, and make offset of images in the overlap region less recognizable.

10 Claims, 38 Drawing Sheets

FIG.6
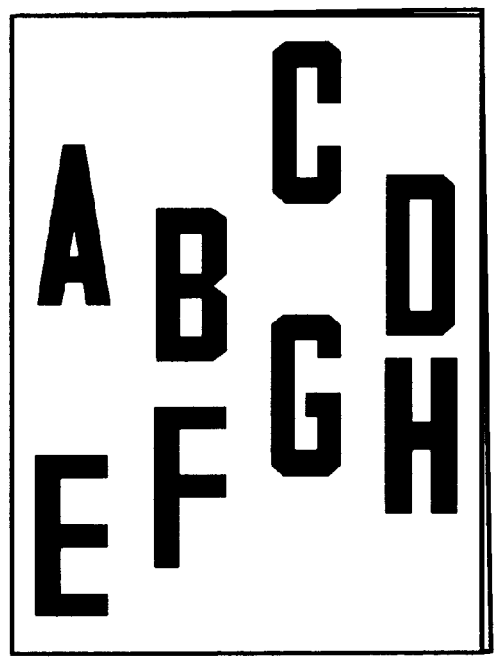
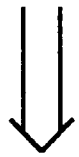
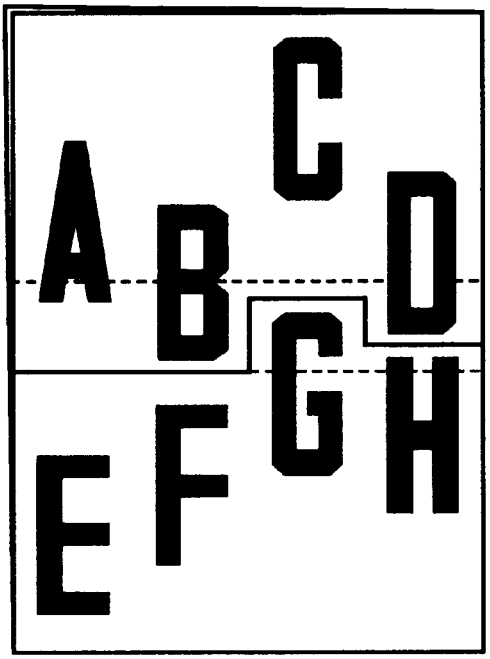

FIG. 10a

|     | Y1  | Y2  | Y3  | Y4  | Y5  |
|-----|-----|-----|-----|-----|-----|
| 200 | 0   | 0   | 0   | 0   |     |
|     | 0   | 0   | 0   | 0   | X1  |
| 100 | 200 | 200 | 100 | 0   |     |
| 0   | 0   | 100 | 200 | 100 | X2  |
|     | 0   | 0   | 0   | 0   | X3  |
| 200 | 200 | 100 | 0   | 200 |     |

FIG. 10b

|     | Y1  | Y2  | Y3  | Y4  | Y5  |
|-----|-----|-----|-----|-----|-----|
| 200 | 0   | 0   | 0   | 0   |     |
|     | 0   | 0   | 0   | 0   | X1  |
| 100 | 200 | 200 | 100 | 0   |     |
| 0   | 0   | 100 | 200 | 100 | X2  |
|     | 0   | 0   | 0   | 0   | X3  |
| 200 | 200 | 100 | 0   | 200 |     |

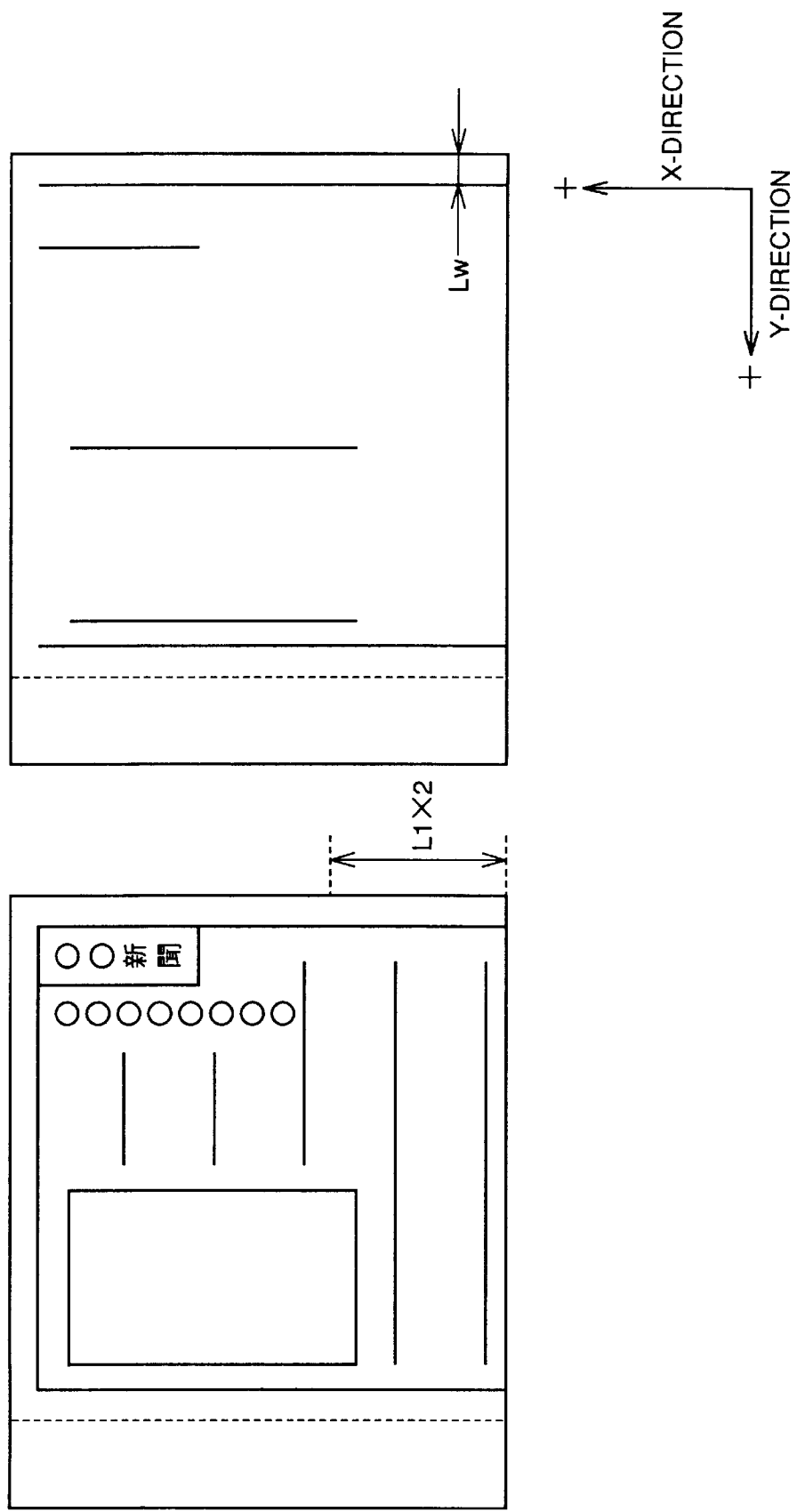

IMAGE PROCESSING APPARATUS CAPABLE OF REPRODUCING LARGE-SIZED DOCUMENT

BACKGROUND OF THE INVENTION

1. Field of the Invention

The present invention relates generally to image processing apparatuses, and more particularly to an image processing apparatus capable of processing a large-sized document.

2. Description of the Related Art

An apparatus has been proposed which divides a large-sized document too large to be wholly placed on a platen into a plurality of images having overlapping portions with each other (a plurality of images having a size placeable on the platen), sequentially reads the images to store in the memory, and combines the divided images for output.

U.S. Pat. No. 5,465,163 discloses an apparatus and a method for reading a plurality of images having overlapping portions with each other divided from a large-sized original image, recognizing the overlapping portions of the divided images through pattern matching to locate border lines with not-overlapping portions, and combining the divided images along the border lines.

As one such conventional technique related to combination of images, U.S. Pat. No. 4,692,812 discloses an apparatus making such a control that a plurality of images having overlapping portions with each other divided from one original image are read, and two adjacent divided images are joined at their overlapping portions and combined, at which time the overlapping portions of the two divided images are each divided into strip shaped small regions, and the strip shaped small regions are alternately selected from the divided images and arranged.

Japanese Patent Laying-Open No. 3-182976 discloses a method of joining two images taken to have overlapping portions. According to the method the densities of the images are converted to be equal and binarized, two feature particles are extracted from each of the binarized images, and the images are joined along a joining line, i.e., a straight line connecting the barycenters of these feature particles. The feature particles herein are produced by extracting particulate small regions formed of a particular number of pixels and determining the particular number of pixels such that the number of small reasons is 2.

The above documents each disclose a joining technique which avoids loss and overlap of images. More specifically, by each of the above joining methods, the adjacent portions of images are read in an overlapped manner so that no part of the original image is lost at the joining part, and border lines (joining lines) are produced within the overlapped regions or at ends and the overlaps are joined and overlaid along the border lines so that overlap or offset of the images do not occur at the joining part.

Corresponding portions between the read images within overlap regions sometimes have different densities. Therefore, such method of joining images while simply avoiding loss and offset of images or overlap of images is encountered with a disadvantage that a line-shaped joining part is recognized because of the density difference.

According to each of such conventional techniques, two partial images are joined by determining a joining position based on the same method regardless of kinds of documents. Therefore, relatively complicated and inaccurate methods are applied in the case of newspaper in which the joining positions may be determined more accurately or more simply taking advantage of the distinctive frames or rules.

The method of determining the position of arranging the partial images through pattern matching of overlaps as disclosed in U.S. Pat. No. 5,465,163 requires a long period of time for its complicated processing and frequently causes erroneous determination.

According to the method disclosed in Japanese Patent Laying-Open No. 4-331567, the direction of placing an original must be predetermined in order to read partial images, which imposes the operator much labor for its complicated operation at the time of setting the original. If the original is set in a wrong direction, an image combination error occurs. For some apparatuses, it may difficult to set partial images in a determined direction.

SUMMARY OF THE INVENTION

It is therefore an object of the present invention to permit a line-shaped joining portion to be less recognizable when a plurality of pieces of divided image data having overlap regions at their border lines are joined into one image for output, in an image processing apparatus.

Another object of the invention is to permit partial images to be joined with less offset of images or more quickly when a particular kind of large-sized document is divided for reading and combined in an image processing apparatus.

Yet another object of the invention is to permit partial images to be combined at correct positions and in correct directions, irrespectively of the order of reading the partial images or the direction of setting the partial images on the platen when a large-sized document is divided for reading and combined, in an image processing apparatus.

An image processing apparatus according to the present invention joins two pieces of image data, first image data and second image data each having one portion overlapping with the other as one image data for output. The image processing apparatus includes a unit for setting a joining line joining the first image data and the second image data such that the image density of the overlap portion on the joining line is minimized, and a combining unit for combining the first image data and the second image data according to the joining line.

A line connecting pixels whose density differences are small between adjacent divided images is extracted as a joining line from an overlap region set at a border line between divided images.

As a result, the density difference at the joining border line decreases. In addition, offset of images at the overlap region becomes less recognizable.

An image processing apparatus according to another aspect of the invention divides a document having a size which cannot wholly be read at a time into parts having overlaps with each other, reads the divided parts, sets a joining line between first image data and second image data thus read in a divided manner and joins them as one image data according to the joining line. The image processing apparatus includes a determining unit for determining kinds of documents, a switching unit for switching between a first joining line setting mode and a second joining line setting mode based on kinds of documents, and a joining unit joining the first image data and the second image data based on a joining line set in response to the first joining line setting mode or the second joining line setting mode.

Since joining positions are determined for combination of images in response to kinds of documents such as newspaper or draft, taking advantage of their characteristics such as fixed frames or rules, partial images can be joined with less offset of images or more quickly.

An image processing apparatus according to yet another aspect of the invention sequentially reads a plurality of partial images divided from a document which cannot wholly be read at a time, and combines the plurality of partial images for output. The image processing apparatus includes memories for storing partial images, a detector for detecting the image density of each edge of a partial image, a determining unit for determining whether or not the edge of the partial image is a margin based on the image density, and determining an arrangement position in combining partial images in response to the position of margin and determining a pair of joining edges to be joined in connection with each partial image, and a joining unit for arranging each partial image at an arrangement position determined by the determining unit and joining the partial images in the pair of joining edges determined by the determining unit.

When partial images divided from a document which cannot wholly be read at a time are combined and output, arrangement positions of the partial images in a combined image and a pair of joining edges to be joined are determined based on the result of detection of the image densities of edges of the partial images. If the order of reading partial images or the direction of setting partial images to be read on the platen are arbitrarily changed, the partial images can be combined at correct positions and in correct directions, which facilitates the operation by the operator and prevents image formation errors.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a view showing an original image and an image combined by reading images divided from the original image;

FIGS. 10a and 10b show how the overlap portions are divided in order to determine a joining border line;

FIG. 24a shows image data stored in an image memory A, with FIG. 24b illustrating a vertical line pattern detected from the image data;

FIG. 30a shows a blank space surrounding an original image, with FIG. 30b showing that adjacent portions of partial images are similar;

DESCRIPTION OF THE PREFERRED EMBODIMENTS

(1) First Embodiment

Figure 2:
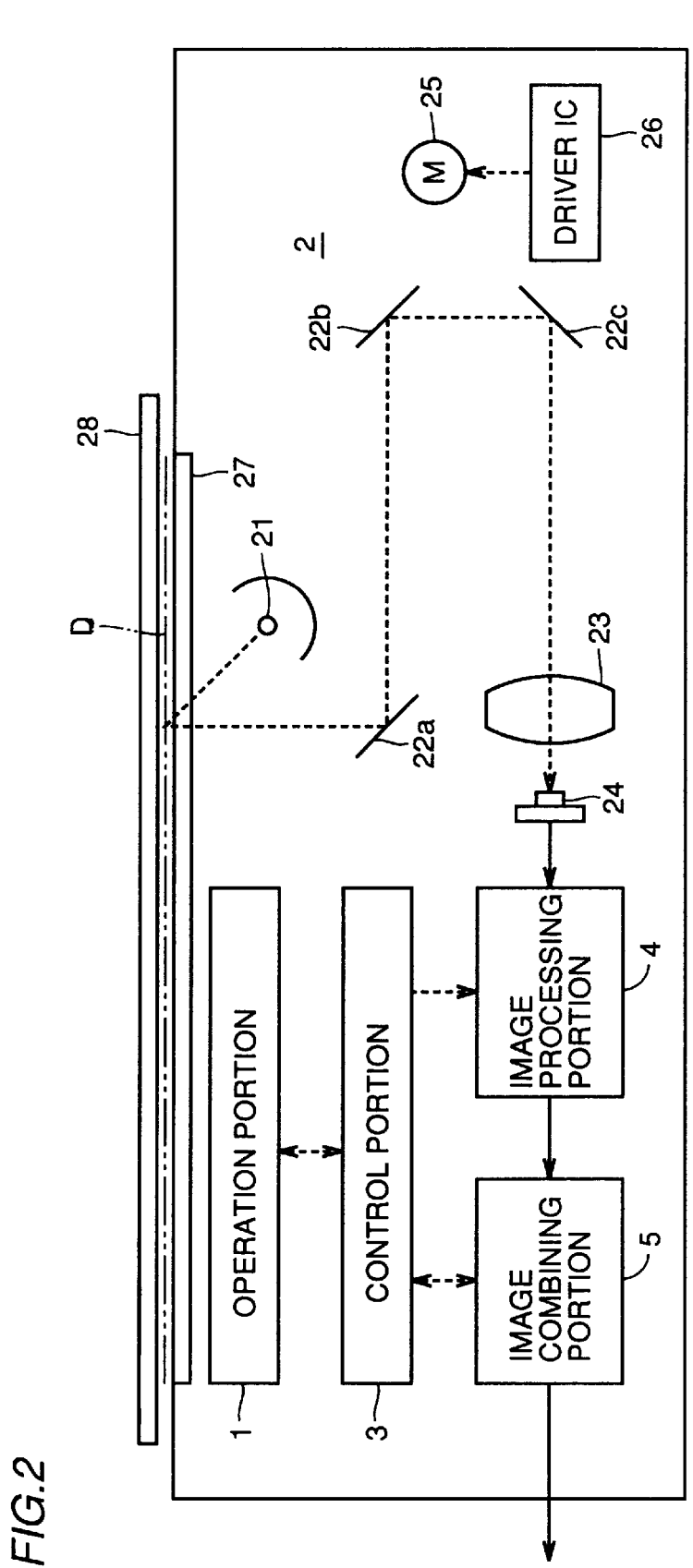
FIG. 2 is a block diagram showing the mechanism of an image reading portion in the apparatus according to the first embodiment.

FIG. 2 schematically shows the configuration of an apparatus according to a first embodiment of the invention.

Figure 28:
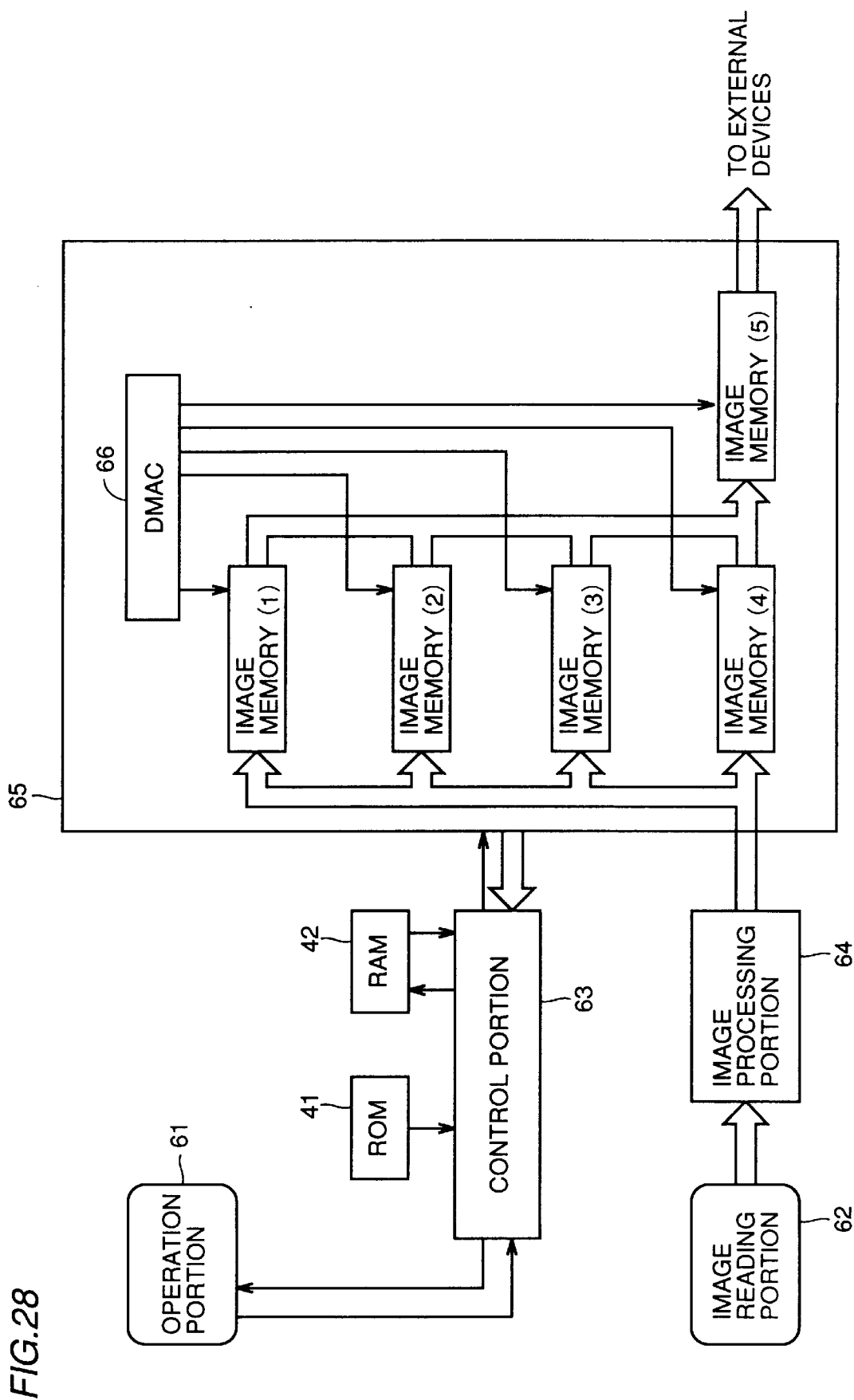
FIG. 28 is a block diagram showing the circuit configuration of essential part of an apparatus according to a third embodiment of the invention.

The illustrated apparatus reads a document D placed on a platen glass 27 with the image facing downward, using a known optical scanning device (including an optical source 21, reflective mirrors 22a, 22b and 22c, lenses 23, a CCD line center 24, a drive motor 25, and a driver IC 26), sends the read image to an image processing portion 4, thereby producing image data through known image processing (A/D conversion, shading correction, change of magnification, etc.), joins the image data at an image combining portion 5 as desired, and outputs the resultant image outside the device. Note that in FIGS. 2, 28 represents a document cover.

The optical scanning device moves a first moving body (not shown) having optical source 21 and reflective mirror 22a and a second moving body (not shown) having reflective mirrors 22b and 22c to the right and left in the figure along the bottom surface of platen glass 27, and forms an image by light reflected from the image of document D at CCD line sensor 24 through lenses 23 on a line-basis. The moving speed of the first moving body is twice that of the second moving body. CCD line sensor 24 responds to the reflective light of the image on the line-basis forming the image as described above, produces the electrical signal of each pixel in a line and outputs the signal to image processing portion 4.

If the magnification is changed in a large-size combination mode as will be described, the scanning rate of the scanning optical device (the moving speeds of the first and second moving bodies) is changed as well as the processing of change in the magnification of image data at image processing portion 4. More specifically, the scanning speed is changed from the reference speed (speed at equal-scale magnification) to a set magnification. This can be accomplished by changing the speed of drive motor 25 of the scanning optical device from the reference speed in response to a set magnification. If, for example, a large-sized document (size A2) is divided, read, reduced to ½ and then combined, the scanning speed is changed to √2 times the reference speed.

Figure 3:
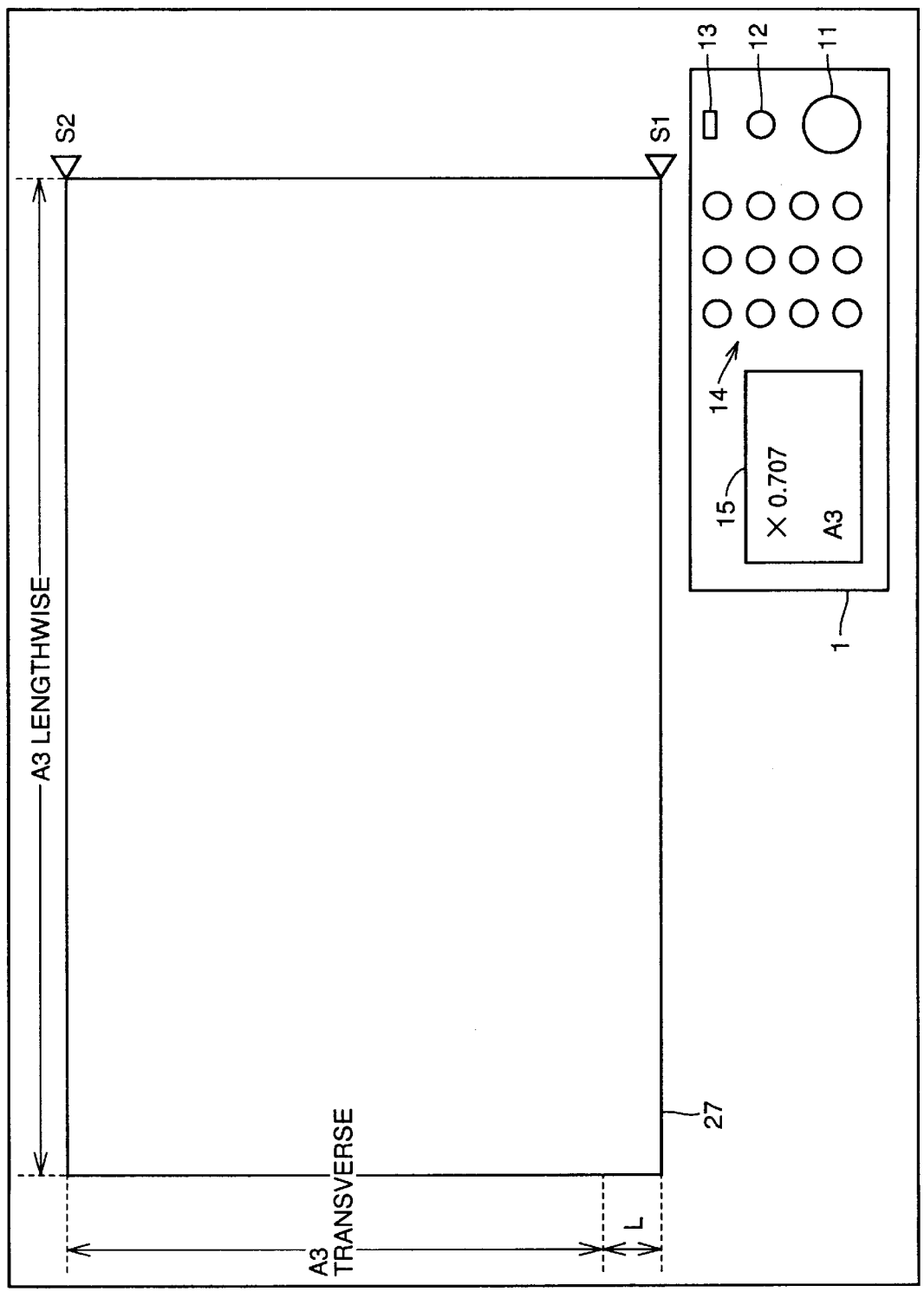
FIG. 3 is a diagram showing a platen in the apparatus according to the first embodiment.

As shown in FIG. 3, platen glass 27 is larger than A3 by L in the transverse direction in FIG. 3. If a document of A2 is divided into two and the two halves are sequentially read, a strip-shaped portion as wide as L is read twice. More specifically, when the upper half of the document is read as shown in the upper left part of FIG. 7, the line designated by S2 in the upper right of FIG. 3 is used as a reference line for matching the upper heads of the document, and the strip-shaped portion having a width of L from the lower edge (on the side of the bottom in the figure) of platen glass 27 in FIG. 3 is an overlapped region. Conversely, if the lower half of the document is read as shown in the upper right part of FIG. 7, the line designated by S1 in the lower right of FIG. 3 is used as a reference line for matching the lower edge of the document, and a strip-shaped portion having width L from the upper edge (on the side of the top in the figure) of platen glass 27 in FIG. 3 is an overlapped region. Note that the document cover 28 is not shown in FIG. 3.

As illustrated in FIG. 3, in the right part of platen glass 27 (the lower right in the figure) an operation panel 1 is provided. Operation panel 1 is provided with a start key 11 for instructing a start of document reading operation, a mode key 12 for instructing switching between a usual mode and a large-size combination mode, a large-size mode indication lamp 13 indicating that the large-size combination mode is set with illumination, a ten key/clear stop key 14 for inputting numerals, and a display panel 15 for displaying the value of reading magnification, reading size, etc.

In the large-size combination mode, a document larger than A3 and equal to or smaller than A2 is divided into two, read at a reduction magnification so that an overlap portion (a strip-shaped portion of width L from the lower edge of platen glass 27 in the case of reading the upper half of the document and a strip-shaped portion of width L from the top edge in the case of reading the lower half) is provided, and the read images are joined along a joining line produced as will be described within the overlap region to combine the images into a single image equal to or smaller than A3 to output.

Figure 1:
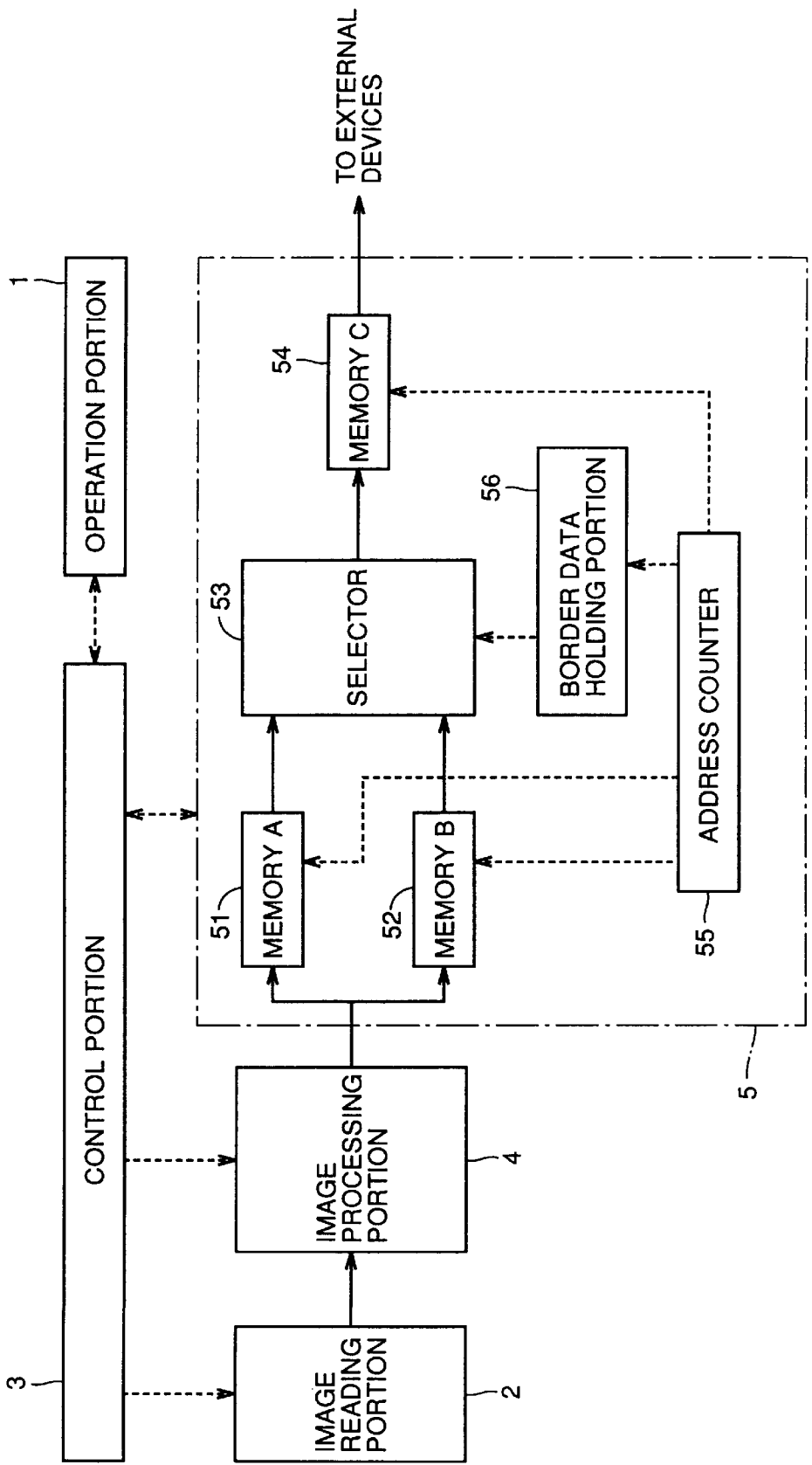
FIG. 1 is a block diagram showing the overall configuration of an apparatus according to a first embodiment of the invention.

The processing of combining two images by joining them in the overlap region is carried out in image combining portion 5. Image combining portion 5 as shown in FIG. 1 includes an image memory A, an image memory B, a selector 53, an address counter 55, a border data holding portion 56 and an image memory C. Image combining portion 5 is controlled by control portion 3 in the same manner as image reading portion 2 and image processing portion 4.

Image memory A stores image data read in the usual mode. In the large-size combination mode, the image data of the upper half read at the reduction magnification for the first time, and image memory B stores the image data of the lower half read at the reduction magnification for the second time.

As described above, when the upper half of a document is read, the strip-shaped portion having width L from the bottom edge of platen glass 27 (in the figure) becomes an overlap region, and when the lower half of the document is read, the strip-shaped portion having width L from the top edge of platen glass 27 becomes an overlap region. In the overlap regions the two images (the image of the upper half and the image of the lower half) are combined. The combination is as will be described carried out by selecting image data belonging to one of the divided image by selector 53.

Therefore, as to each pixel within the overlap regions, image memory A and image memory B should have a common address. Therefore, for example, such an address shift processing is carried out that the address produced by going back the addresses corresponding to the overlap portion from the last address of image memory A is allocated as the head address of image memory B, and thus the addresses of the overlap region become common between image memory A and image memory B. If, for example, image memory A is allocated with addresses 1 to 180, among which addresses 121 to 180 correspond to the overlap region, image memory B is allocated with addresses 121 to 300, among which addresses 121 to 180 correspond to the overlap region. Note that the addresses of the overlap portion may be common for image memory A and image memory B by changing the positional reference of images when the images are stored in image memory A and image memory B.

Image memory C may store image data equal to or smaller than A3. In the usual mode, image data in image memory A is transferred and stored in image memory C. In the large-size combination mode, a combined image of images from image memory A and image memory B is stored. The image data in image memory C is output to external devices such as printer and facsimile (not shown).

Address counter 55 instructs the address of data to be input/output in response to input/output of image data to/from image memories A, B and C.

Selector 53 in the usual mode transfers image data read out from image memory A directly to image memory C.

Selector 53 selects one of image data at the same address simultaneously read out from image memory A and image memory B in the overlap region in the large-size combination mode in response to an instruction from border data holding portion 56, and transfers the selected image data to image memory C. Note that even in the large-size combination mode the addresses of image memory A and image memory B do not coincide in the non-overlap region, and therefore image data in the address instructed by address counter 55 is directly transferred to image memory C.

Figure 9:
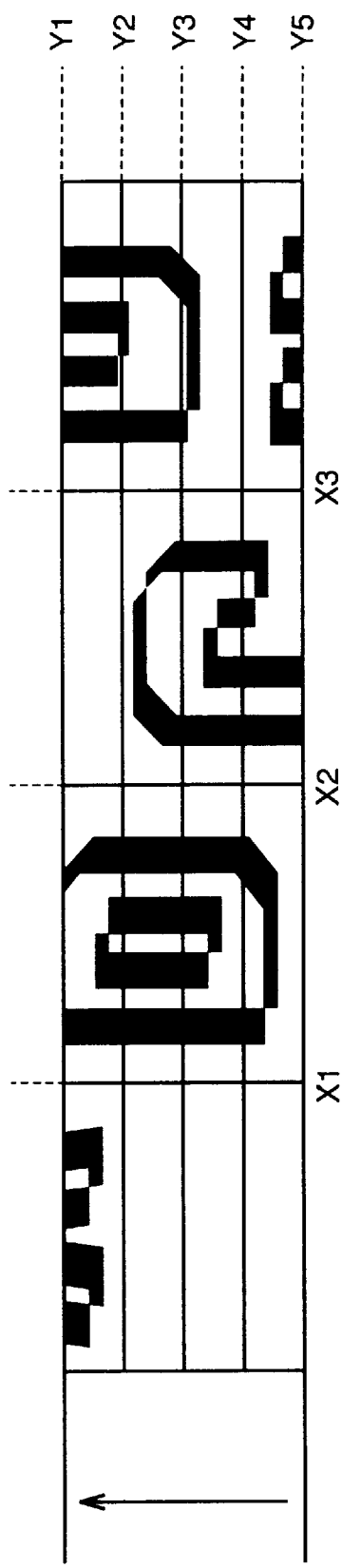
FIG. 9 is a view showing offset of images at the overlap portions in FIG. 8.

Border data holding portion 56 stores an address corresponding to border shape data determined by an operation in control portion 3 (in this case, a border line shape data selected from a lattice-shaped line data corresponding to X1 to X3 and Y1 to Y5 shown in FIG. 9), and controls the switching operation of selector 53 based on the border shape data. Thus, in the overlap region in the large-size combination mode, one of image data (image data pair) in the same address in image memory A and image memory B is selected based on the border shape data and transferred to image memory C as described above.

Figure 4:
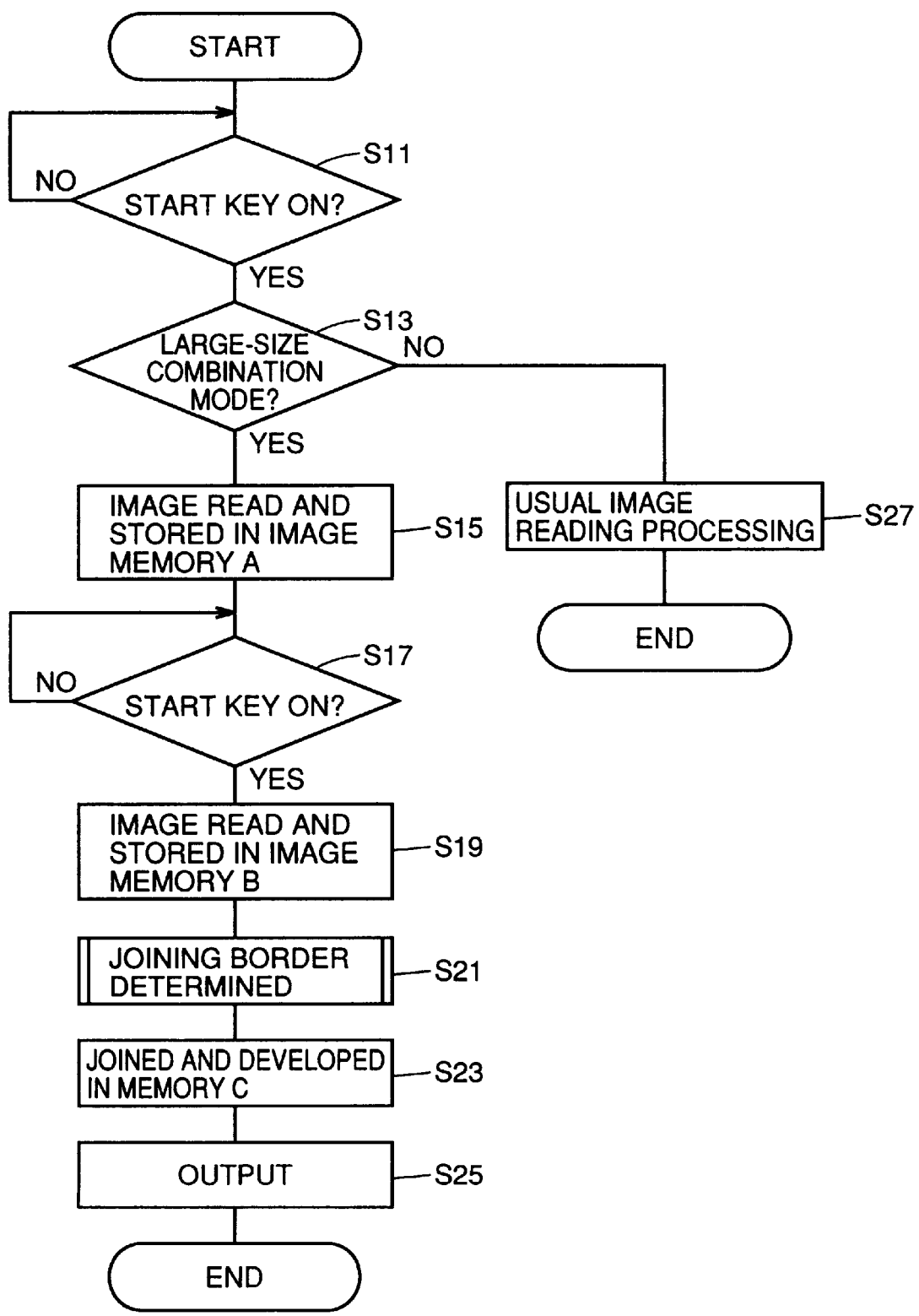
FIG. 4 is a flow chart for use in illustration of a processing at a control portion in the apparatus according to the first embodiment.
Figure 5:
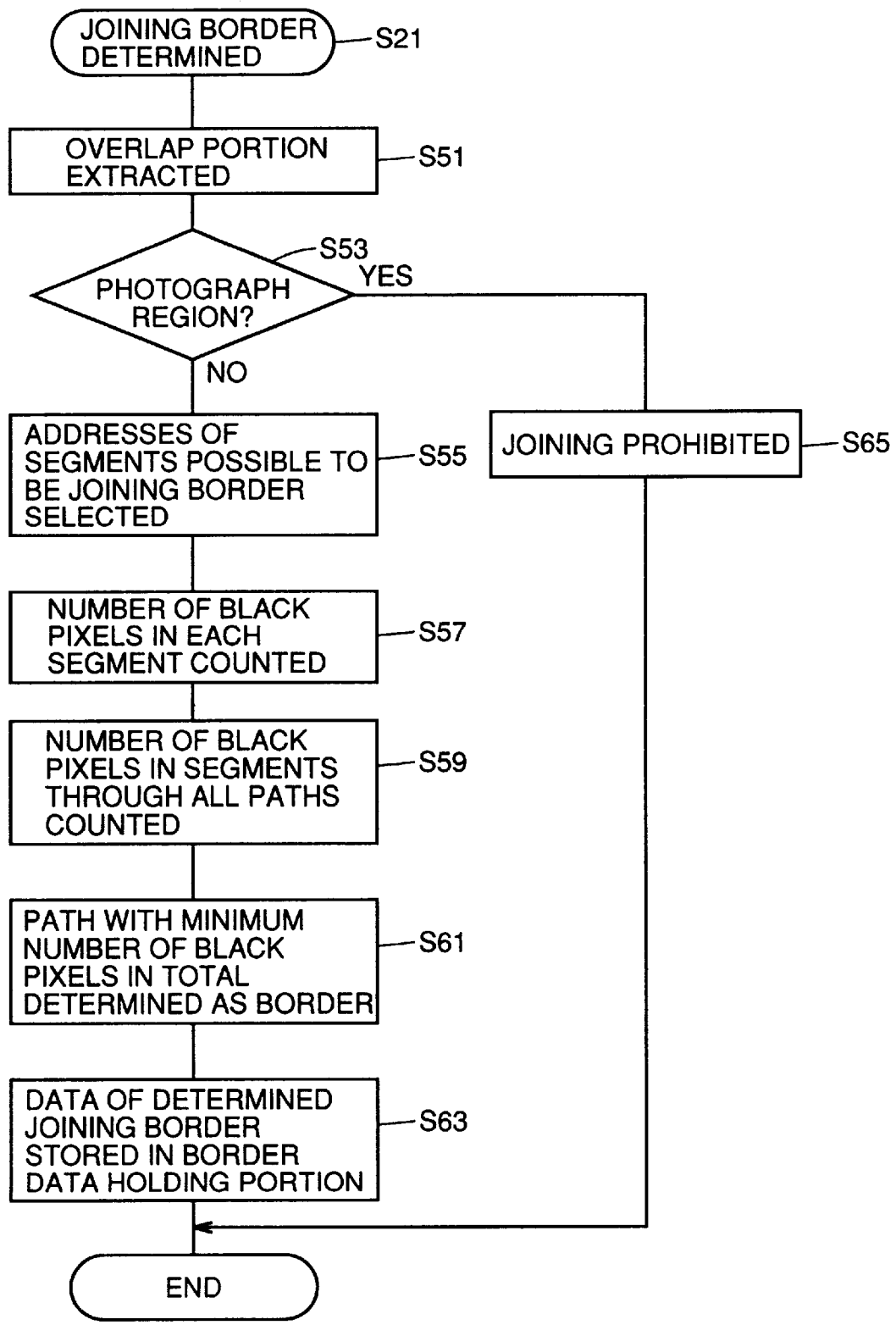
FIG. 5 is a flow chart for use in illustration of the step of joining border determination according to FIG. 4.

The operation for producing the joining border shape data is detailed in conjunction with FIGS. 4 and 5. FIG. 4 shows the operation procedure if the large-size combination mode is selected.

If start key 11 is turned on (S11; YES), it is determined whether or not the large-size combination mode is set (S13), and if the usual mode is set (S13; NO), a usual image reading processing is carried out (S27). More specifically, image data in image memory A is directly transferred to image memory C for external output.

If it is determined that the large-size combination mode is set in step S13 (S13; YES), first as for the upper half of the document (to be exact, the upper half of the document and the overlap portion of width L in the center of the document as shown in the upper left part of FIG. 7), an image reading operation and an image data processing are carried out (S15). More specifically, the document set with the upper edge of thereof being matched to the edge of platen glass 27 (the edge designated with S2) is read by image reading portion 2, and an image signal based on the read image is processed by image processing portion 4 into image data, and the image data is stored in image memory A. In this example, a document of A2 is divided, read and then combined in a size of A3, and therefore, the reduction magnification at the time of reading the image is 0.707.

Then, the document is placed on platen glass 27 with its lower edge being matched with the edge (the edge designated with S1), then start key 11 is turned on (S17; YES), and then the lower half of the document (to be exact, the overlap portion of width L in the center of the document and the lower half of the document as shown in the upper right part of FIG. 7) is subjected to an image reading operation and an image data processing (S19). More specifically, the image reading operation by image reading portion 2 (the reduction magnification is also 0.707) is carried out, a signal based on the read image is processed by image processing portion 4 into image data, which is then stored in image memory B.

The address to store the image data of the portion of width L in the center of the document is common between image memories A and B as described above. The image data has been stored in image memory A followed by completion of storing of image data in image memory B, and then a joining border is determined (S21). The processing will be described later.

When the joining border is determined, image data joined along the joining border is developed in image memory C (S23), and externally output (S25). "The image data joined along the joining border" refers to "data selected from image memory A or image memory B based on the joining border shape data by selector 53 which is controlled by border data holding portion 56 and transferred to image memory C".

Now, the joining border determination processing (S21) will be detailed in conjunction with FIG. 5.

Image data in the overlap region is each extracted from image memory A and image memory B (S51). More specifically, from image memory A, the image data corresponding to the strip-shaped portion of width L from the bottom edge of platen glass 27 is extracted. From image memory B, the data corresponding to the strip-shaped portion of width L from the top edge of platen glass 27 is extracted. The addresses of the image data of pixels to be paired within the overlap region are the same as described above. The pixels to be paired refer to pixels in overlap positions when "the strip-shaped portion of width L from the bottom edge of platen glass 27" and "the strip-shaped portion of width L from the top edge of platen glass 27" are placed upon each other.

Then, it is determined whether or not the overlap region is a photograph region (S53). As a result, if it is a photograph region (S53; YES), joining is prohibited (S65).

If it is determined that the region is not a photograph region in step S53 (S53; NO), joining border data is determined according to the procedure of processings in steps S55 to S63.

In the overlap region, as shown in FIGS. 10a and 10b, 32 segments in total each possible to be a joining border are determined (S55). More specifically, segments X1 to X3 and segments Y1 to Y5 are determined, then segments X1, X2 and X3 are each divided into 4 by Y2, Y3 and Y4 to form 12 segments, while segments Y1, Y2, Y3, Y4 and Y5 are each divided into 4 by X1, X2 and X3 to form 20 segments. Thus, the 32 segments in total are determined.

Then, as for each of the 32 segments, the number of pixels regarded as black pixels among pixels positioned on each segment are counted (S57). Herein, the pixels regarded as black pixels refer to pixels having the same address in image memory A and image memory B, in other words, the paired pixels, the pixels having a difference in pixel data value above a prescribed value. A pair of pixels stored as "white" in image memory A while as "black" in image memory B are the black pixels.

Figure 8:
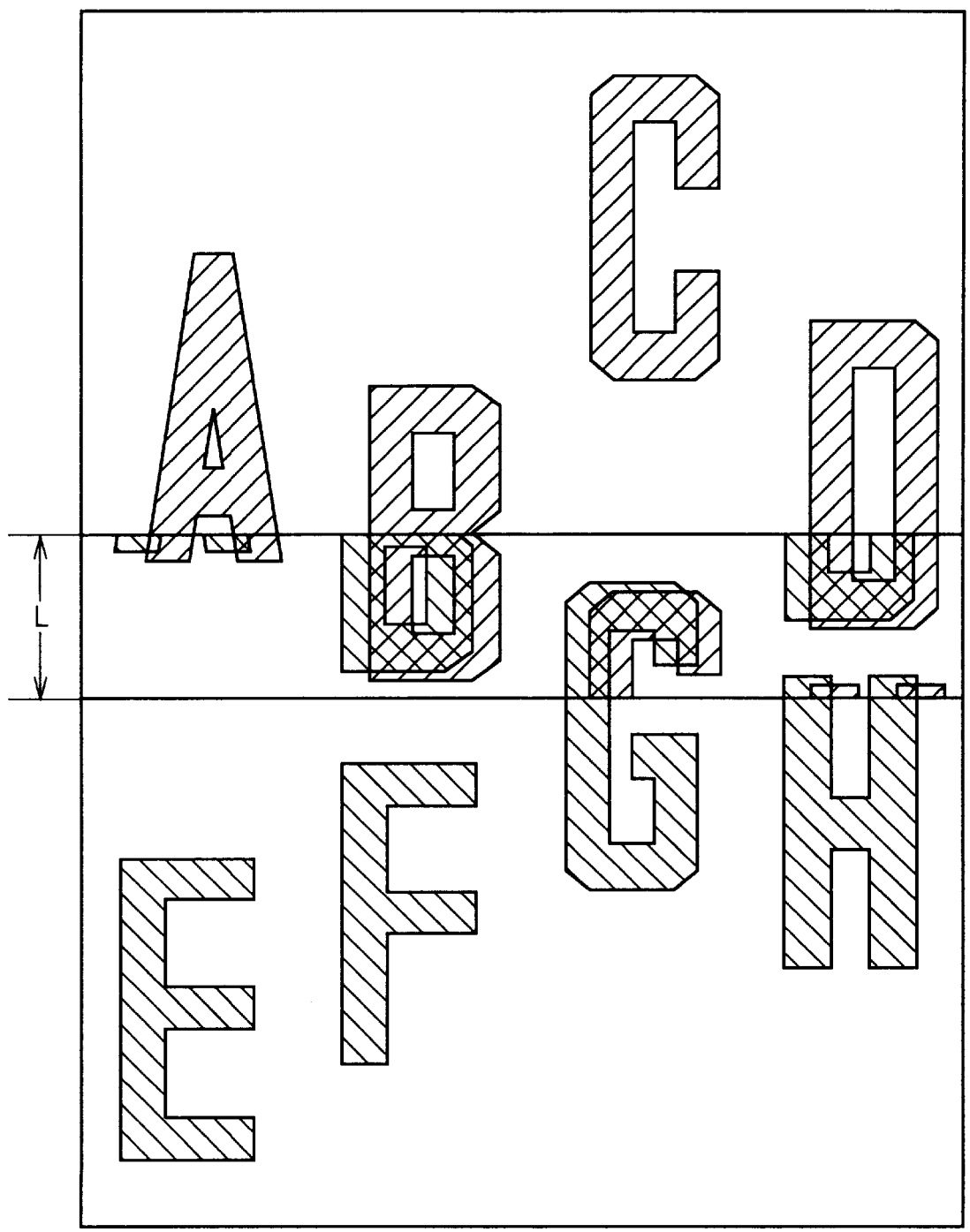
FIG. 8 is a view showing how divided images are superposed at their overlap portions.

For example, as shown in FIG. 8, four images are offset in the overlap region L, the difference between pixel data is produced for respective pixels to be paired, and the pixels with the difference higher than the prescribed value are blacked out in FIG. 9. The pixels in the blacked out portion on the segment are counted as black pixels.

In this embodiment, a combination (path) of segments with a minimum number of black pixels is selected as a joining border (S59, S61). More specifically, in FIGS. 10a, 10b, if a path is taken from one of the left ends of segments Y1, Y2, Y3, Y4 and Y5 to one of the right ends of segments Y1, Y2, Y3, Y4 and Y5 (the paths corresponds to the combinations of the 32 segments, i.e., $5^4$=625 paths exist), the path with the minimum number of black pixels thereon is selected as the joining border (S61).

Figure 11:
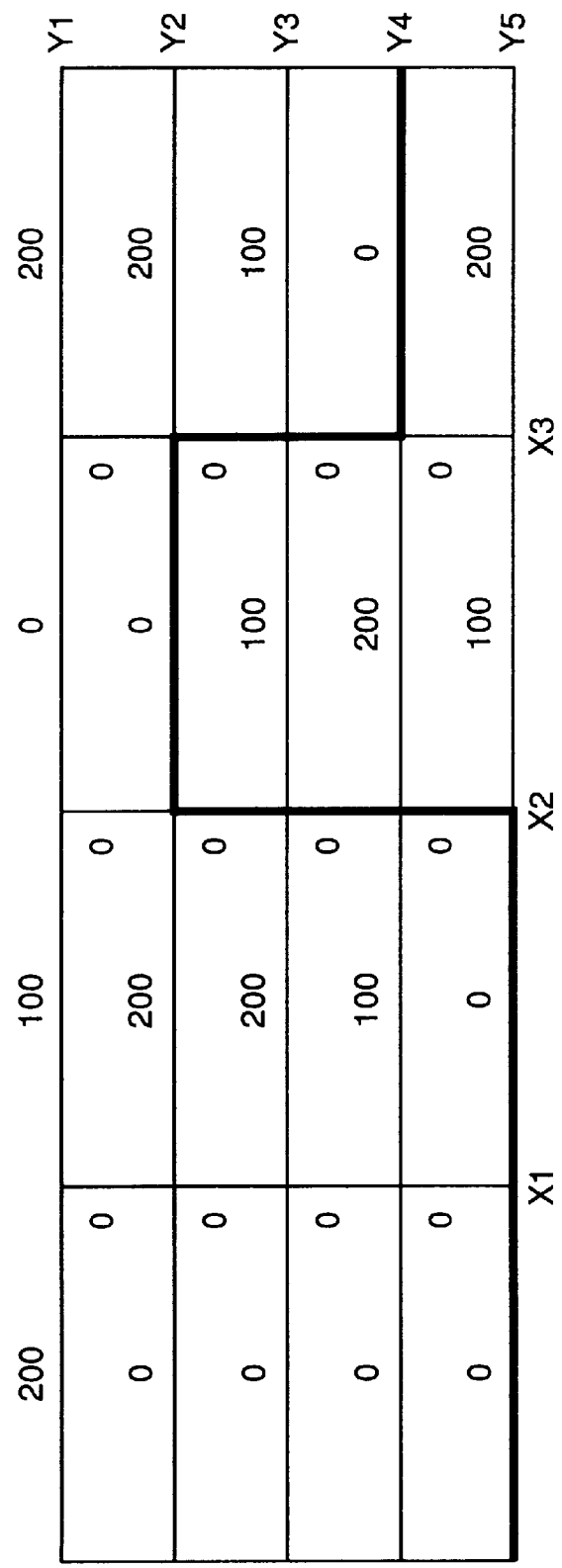
FIG. 11 shows a joining border line at the overlap portion for the image shown in FIGS. 6 to 9.

This procedure will be described in conjunction with FIGS. 10a, 10b and 11. In FIGS. 10a, 10b and 11, a number near each segment indicates the number of black pixels on the segment.

For example, if the path denoted with the thick line in FIG. 10b is selected from the group of segments with the distribution of the numbers of black pixels as shown in FIG. 10a, the total number of black pixels on the path amounts to "0+0+0+0+0+100+0+0+0+0+100+0+0+0+0+200=400".

On the other hand, if the path designated with the thick line in FIG. 11 is selected from the group of the same segments, the total number of the black pixels on the path amounts to "0+0+0+0+0+0+0+0+0+0+0+0+0+0+0+0=0".

More specifically, the path along the thick line in FIG. 11 has a smaller number of black pixels than the path along the thick line in FIG. 10b. In this embodiment, the path shown in FIG. 11 is selected, and is determined as the joining border shape.

Figure 7:
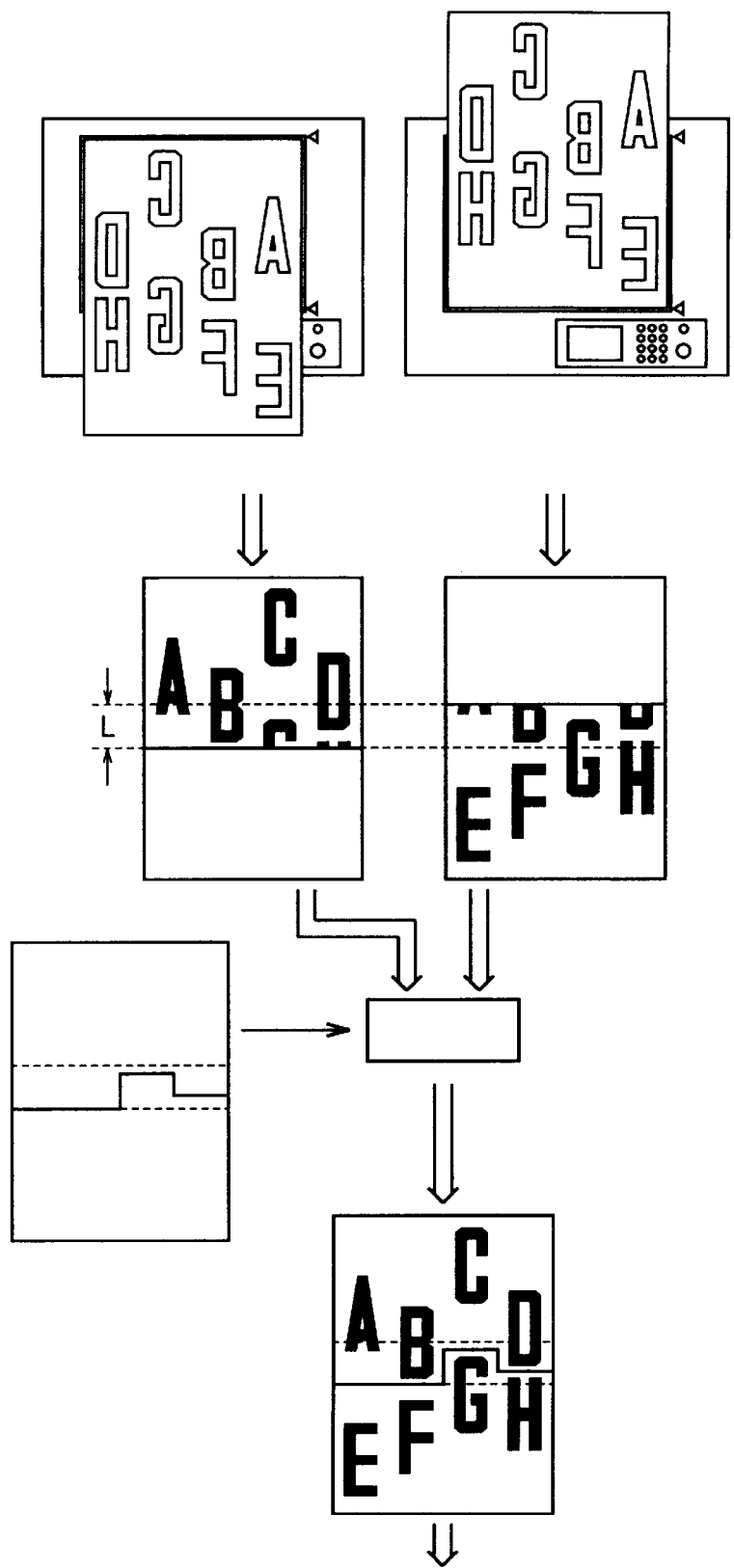
FIG. 7 is a view for use in illustration of a processing in the apparatus according to the first embodiment.

The data indicating thus determined joining border shape is stored in border data holding portion 56. Based on the data, the switching operation of selector 53 is controlled as described above, the image data selected from image memory A or image memory B is transferred to image memory C. Thus, as shown in FIG. 7, the two pieces of image data are joined smoothly at the border portion with no density difference.

In the above embodiment, differences between respective image data from image memory A and image memory B are produced as for pixels to be paired, and the pixels having the value surpassing a prescribed value is counted as black pixels. More specifically, the pixels in the portion having a large density difference due to the offset of the two divided images (the portion blacked out in FIG. 9) are counted as black pixels. Therefore, if, for example, an image is drawn in white in a black background can quickly be processed.

Figure 12:
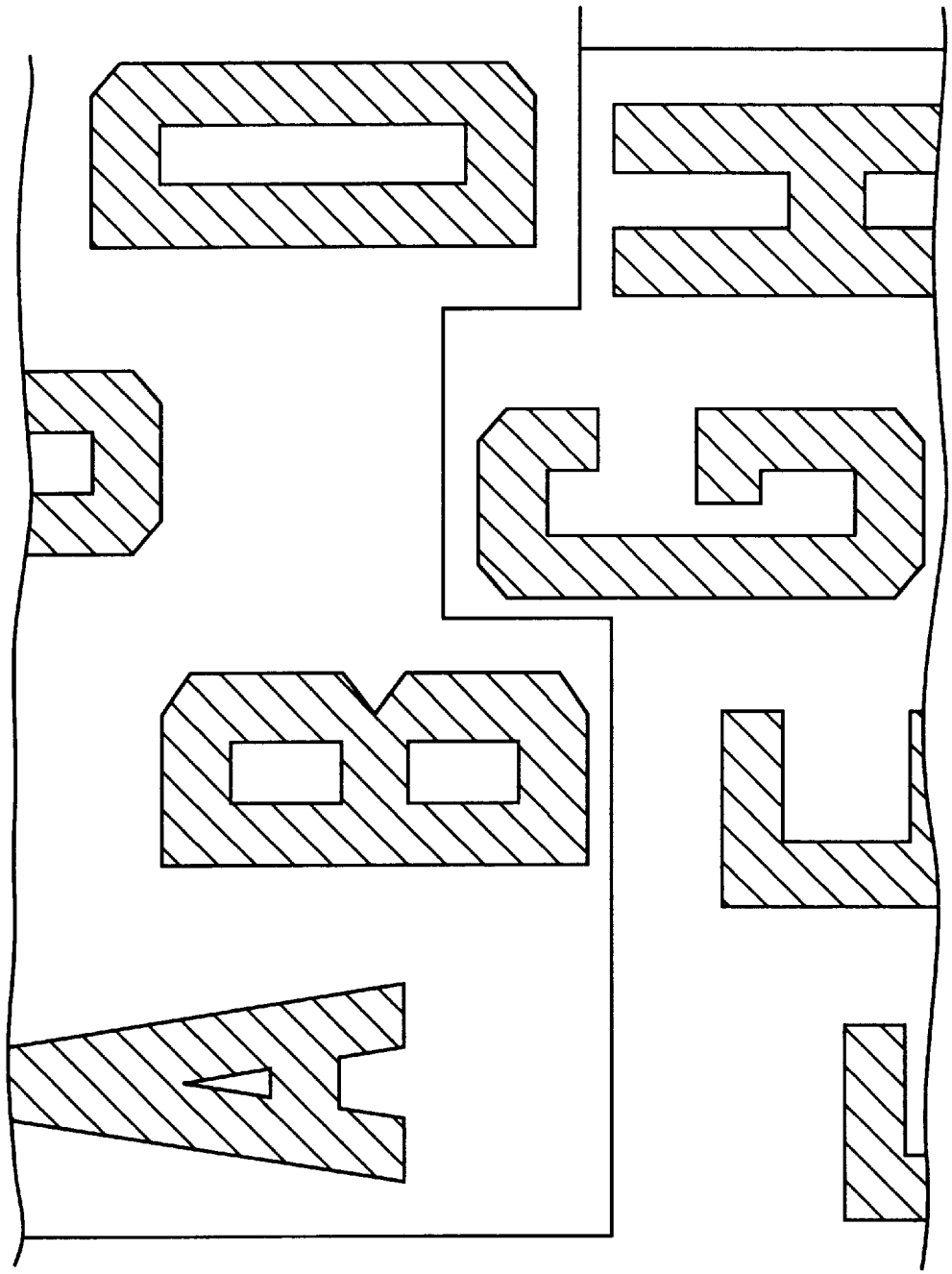
FIG. 12 is a view showing the joining border line in FIG. 11 and the overlap portions of the image shown in FIGS. 6 to 9.
Figure 13:
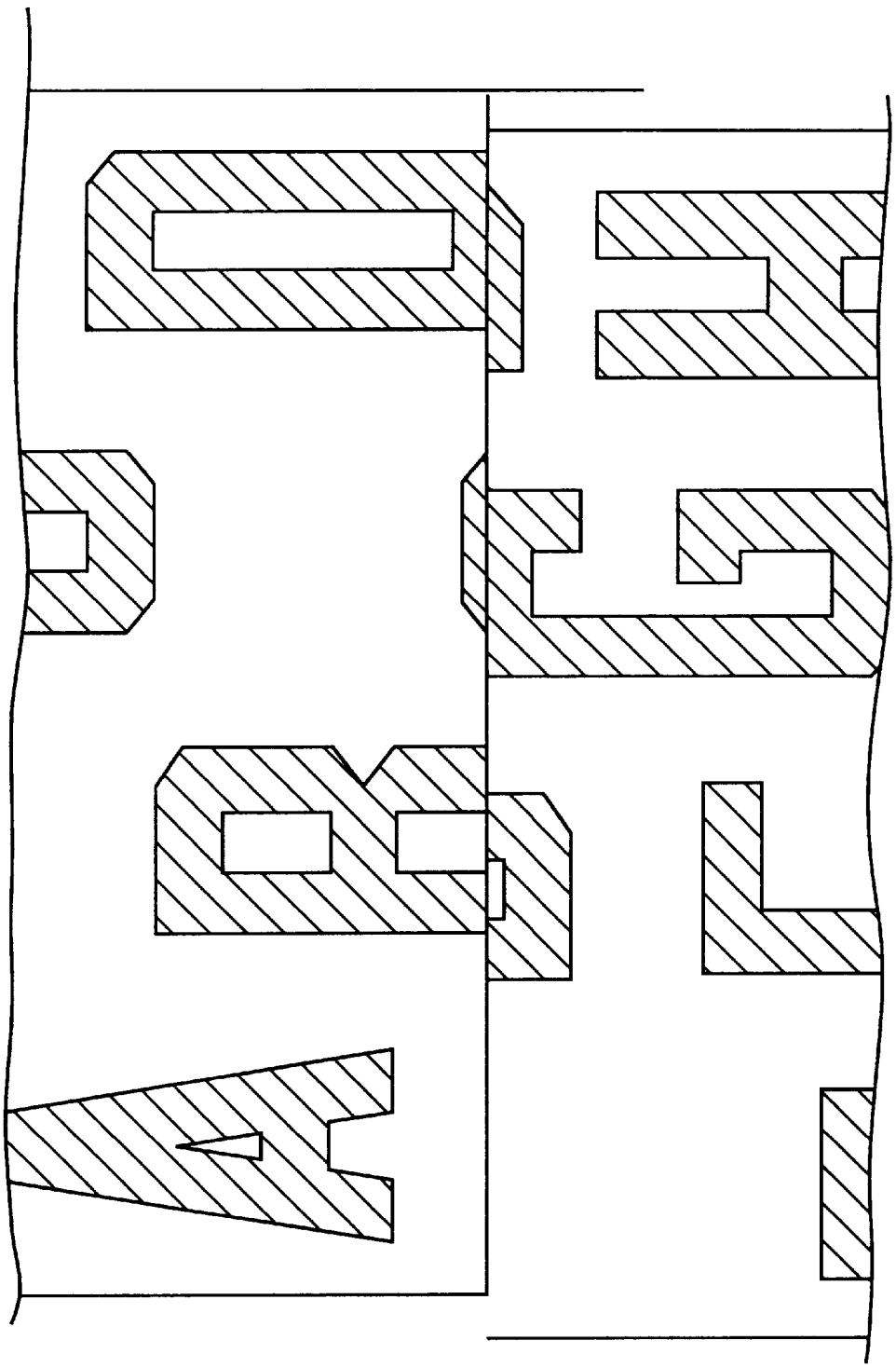
FIG. 13 is a view showing the case of joining the images shown in FIGS. 6 to 9 according to a conventional method.

The apparatus according to this embodiment not only permits a density difference to be less recognizable if such a density difference exists in the overlap portion of divided images depending upon the condition of reading, but also permits an offset of two images joined to be less recognizable if such an offset exists in the overlap portion between the first reading (the upper half and overlap) and the second reading (the lower half and overlap). Note that FIG. 12 shows a case of joining images by the apparatus according to the present invention, while FIG. 13 the case by a conventional apparatus.

In this embodiment, the path with a minimum density difference between the pixel data values of corresponding positions (at the same address) within the overlap region in image memory A and image memory B is selected as the joining border, but the present invention may alternatively be embodied as follows.

A path through a background region may be selected as a joining border. More specifically, as for the overlap region of one of image memory A and image memory B, the pixels in the portion with a density larger than a prescribed background density may be detected as black pixels, and processed in the same manner as the above embodiment.

Figure 14:
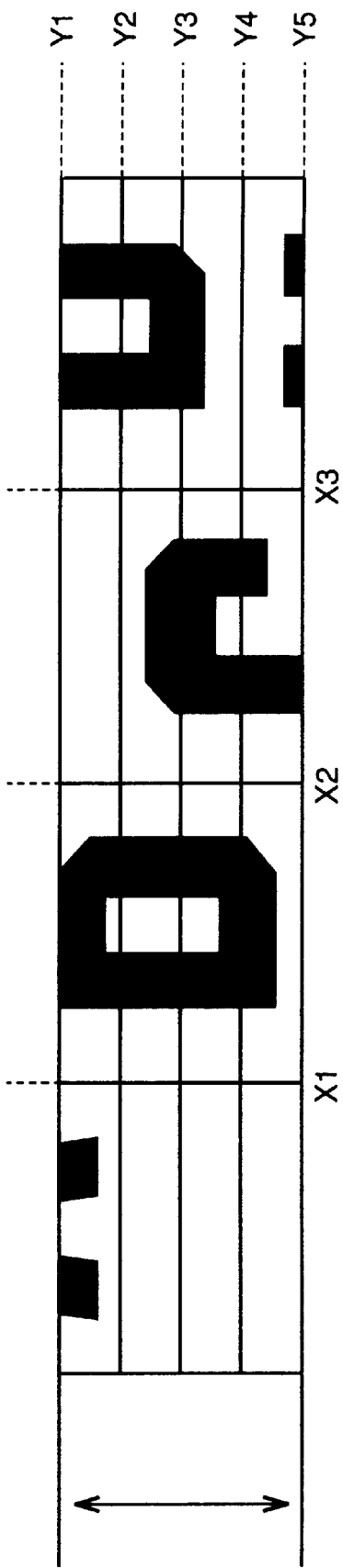
FIG. 14 is a view showing an algorithm for producing a joining line from the overlap region of one image of adjacent images.

FIG. 14 shows the portion having a large density difference with respect to a prescribed background density detected as a black pixel (the portion blacked out in FIG. 14) as for image data in image memory A. Note that segments X1 to X3, Y1 to Y5 are the same as those in the above embodiment. In this example, one of segments Y2 to Y5 is selected between the left end and X1, segment Y5 is selected between X1 and X2, segment Y2 is selected between X2 and X3, and segment Y4 is selected between X3 and the right end. In the embodiment shown in FIG. 14, in one divided image (image in image memory A in FIG. 14), a path along segments selected to avoid a portion with a large density difference with respect to the background portion (black pixels) is determined as a joining border shape and is used for controlling the switching operation of selector 53 as with the above embodiment, and the divided images are joined.

Note that in order to extract a pixel having a value larger than the background density by a certain value, the difference between the value and the produced background density may be produced, but a pixel having a density difference with respect to adjacent or near pixels larger than a prescribed value may be selected.

Figure 15:
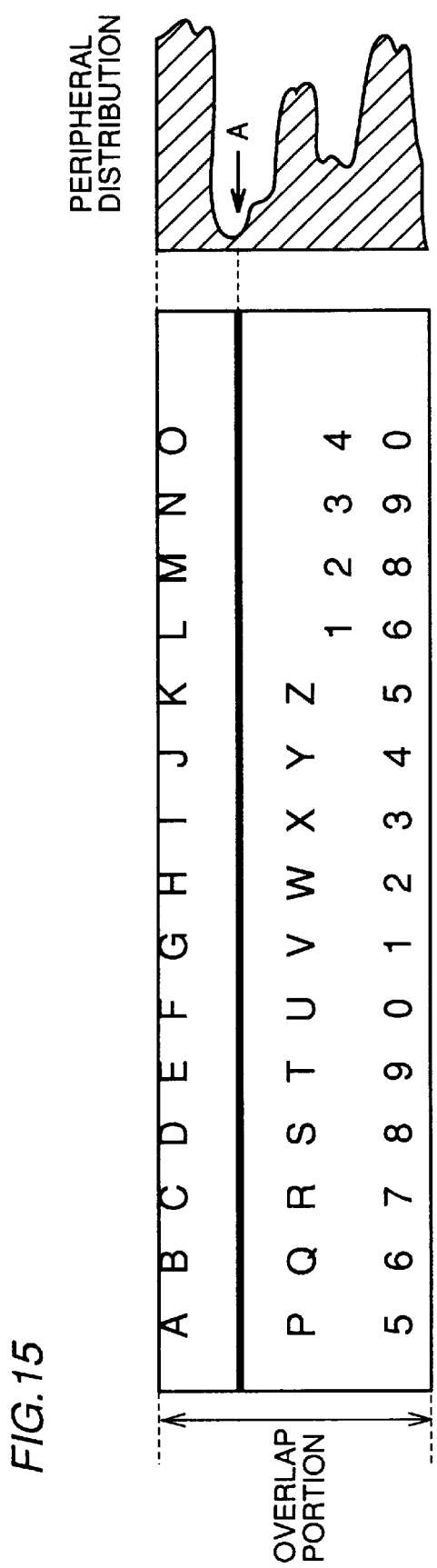
FIG. 15 is a view showing another algorithm different from FIG. 14 in order to produce a joining line from the overlap region of one image of adjacent images.

As in FIG. 15, the path through the background region may be selected by selecting the joining border line avoiding the letter region or photograph region. More specifically, the densities of pixels in total are produced for every line in the transverse direction, and the line with a minimum total value may be selected as a joining border line (line designated with arrow A/line designated with thick line). This method is effective if an image having regularly arranged characters.

A path through a portion with less density change or a path through a portion with less colour change for a color image may be selected. Alternatively, the joining border shape may be selected depending upon the character region or photograph region, and the selection algorithm may be changed.

In each of the above embodiments, each between the left end X1; X1 and X2; X2 and X3; and X3 and the right end;, the number of segments to be selected is less than 2. Stated differently, the segment is selected so that there is no return path. However, a selection may be carried out to allow such a return path. In that case, the amount of data to process increases, but joining may be conducted better in some cases. Note that in order to avoid extreme increase in the amount of data to process, the upper limit may be set for the length of the total path.

(2) Second Embodiment

Now, a second embodiment of the invention will be described.

The overall configuration of the image processing apparatus according to the second embodiment is basically the same as that of the first embodiment. Therefore, only difference from the first embodiment will be detailed.

Figure 17:
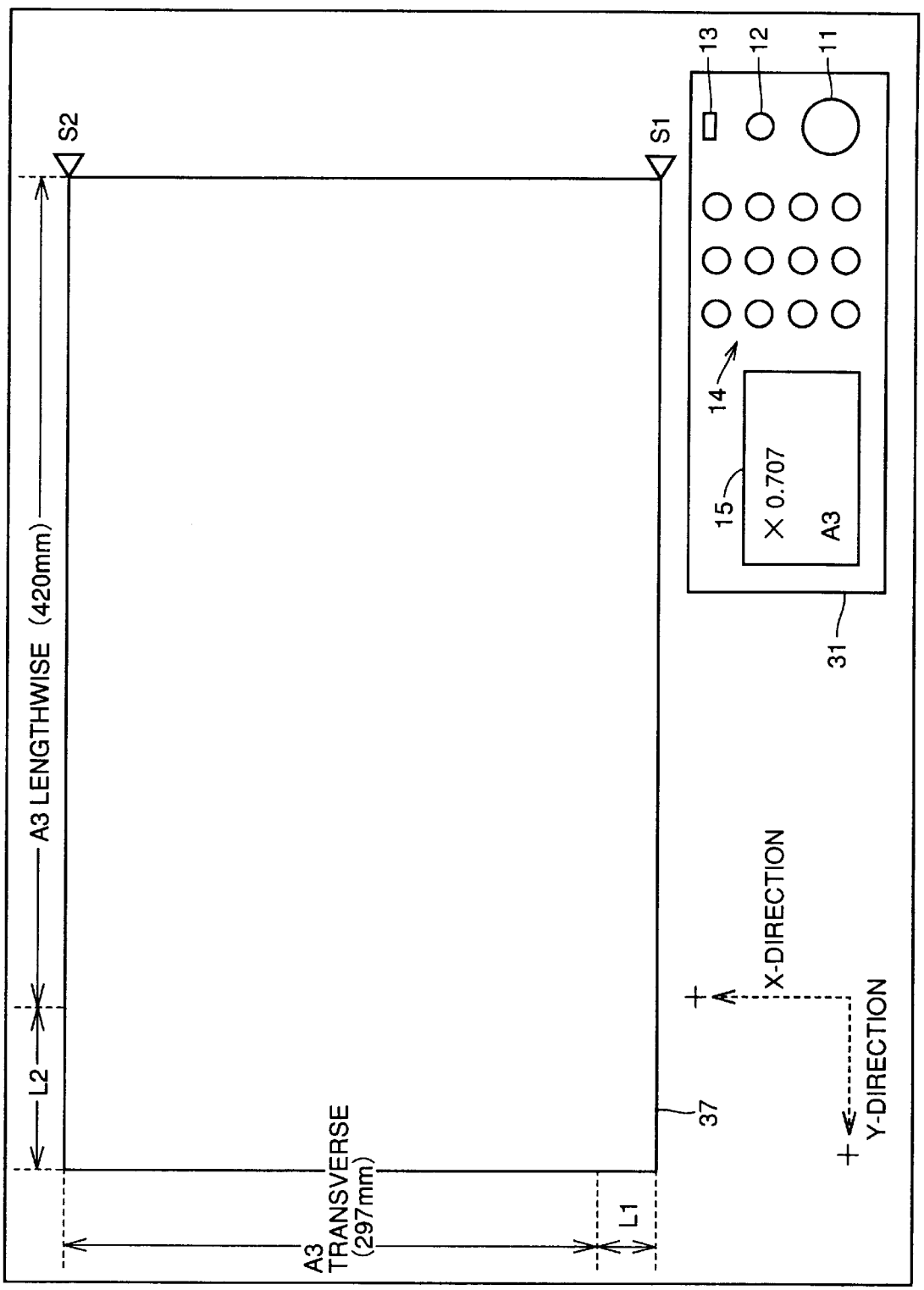
FIG. 17 is a plan view showing an operation panel and a platen in the apparatus according to the second embodiment.
Figure 18:
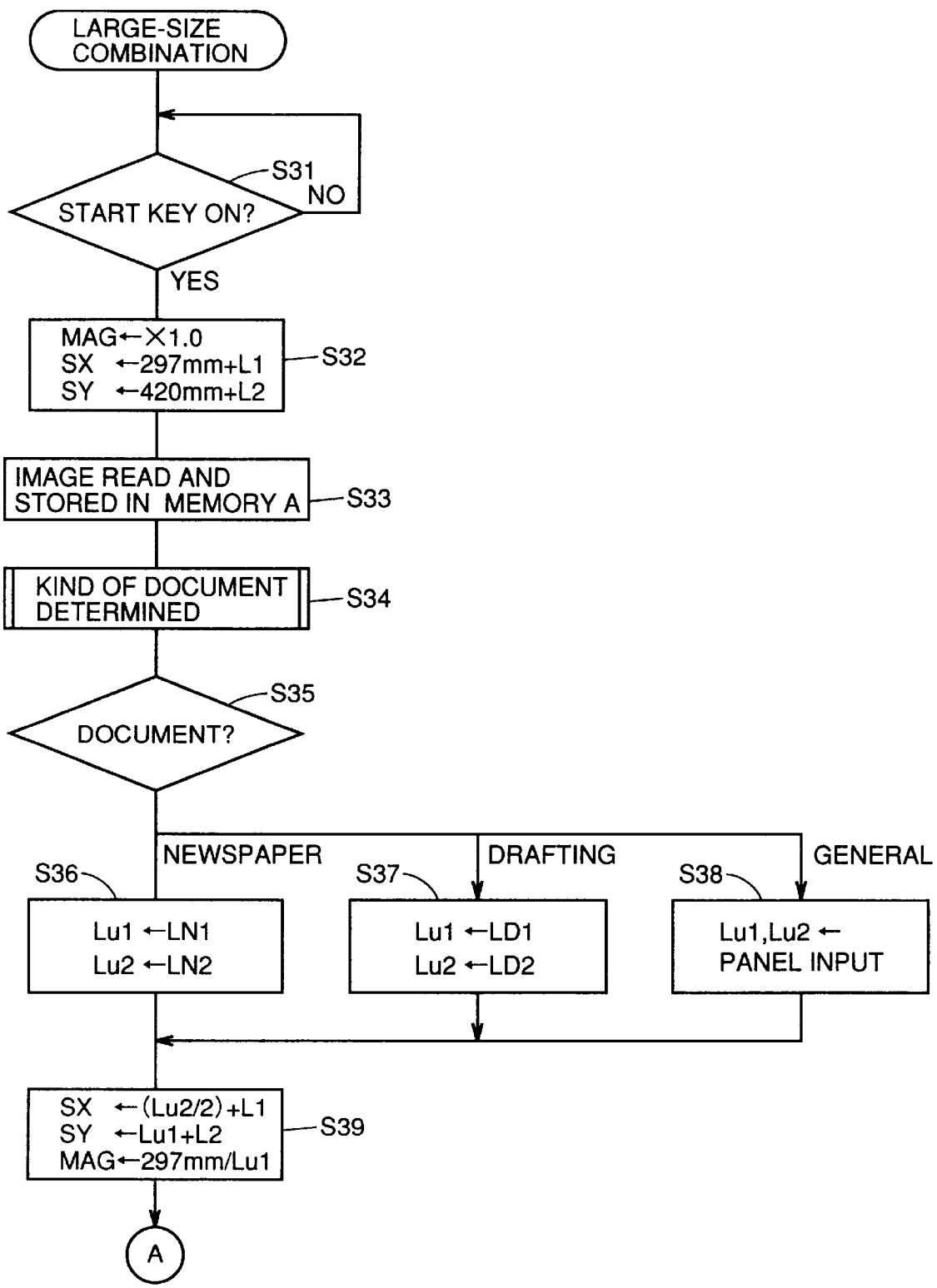
FIG. 18 is a flow chart showing part of a processing in a large-size combination mode in the apparatus according to the second embodiment.
Figure 19:
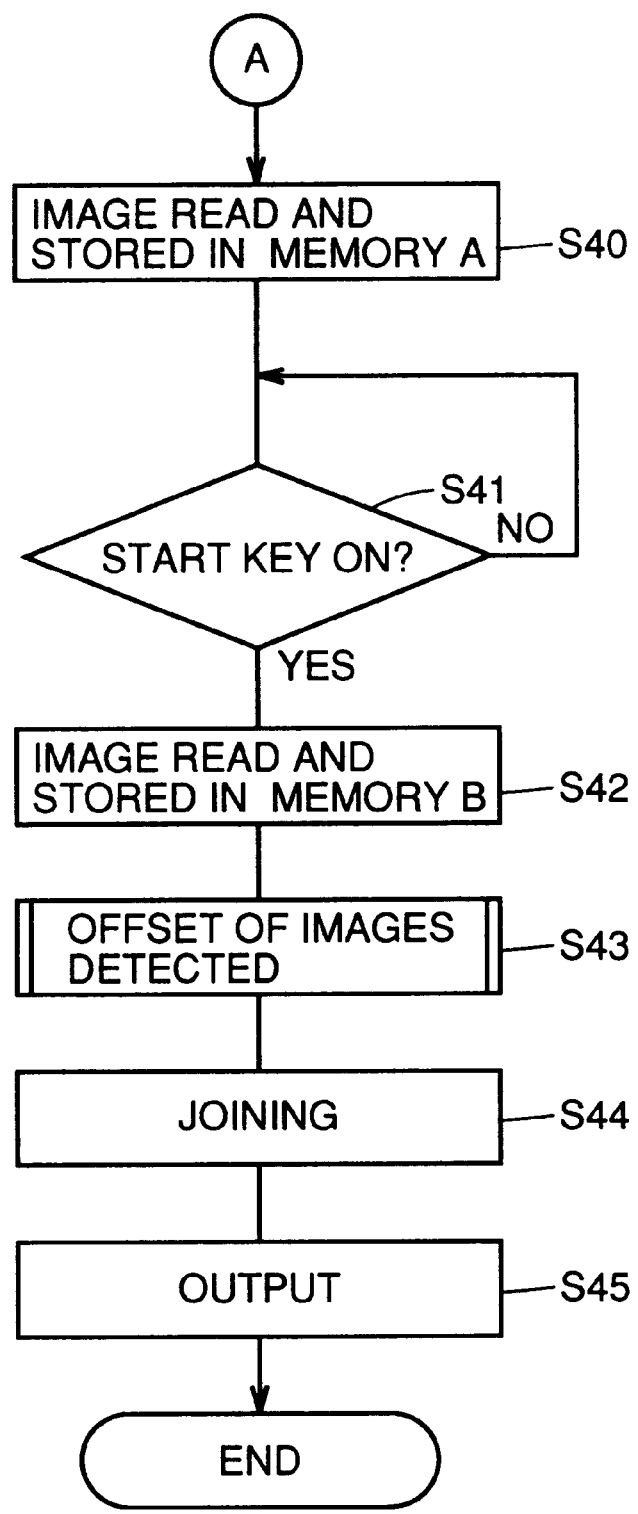
FIG. 19 is a flow chart showing the remaining part of the processing in the large-size combination mode in the apparatus according to the second embodiment.

FIG. 17 is a view showing platen glass 37 in the second embodiment. In this embodiment, the same reference characters and numerals represent the same or corresponding portions as the first embodiment.

Figure 22C:
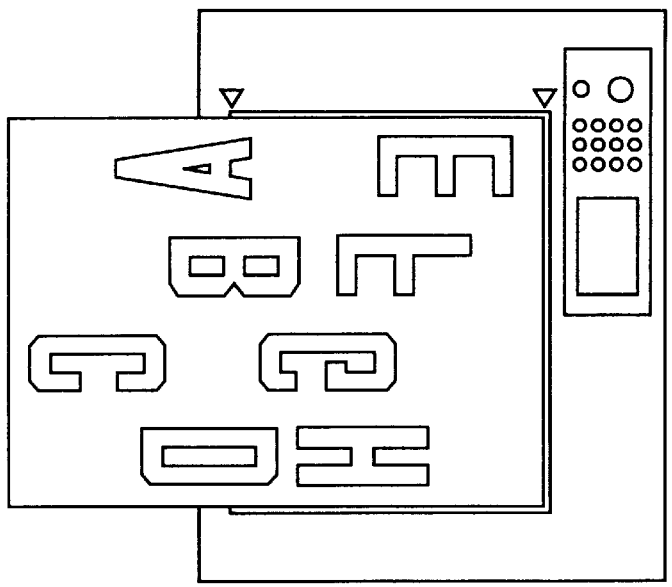
FIGS. 22a, 22b and 22c are views showing the position of placing a large-sized document on the platen.
Figure 22B:
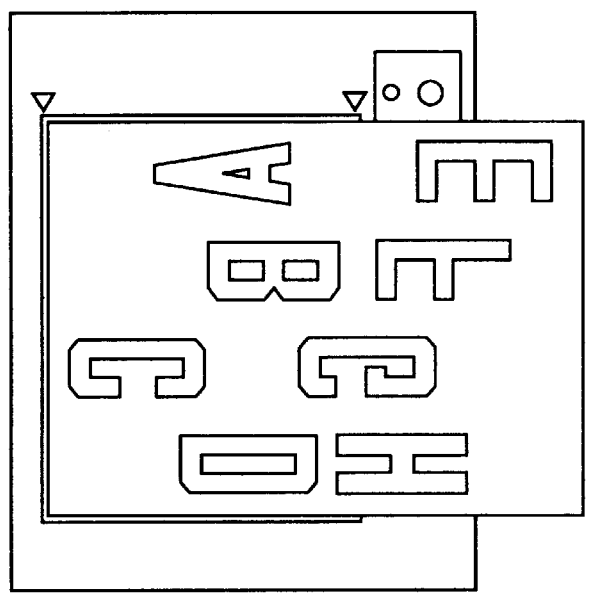

Platen glass 37 is larger than A3 by L2 in the lengthwise direction in FIG. 17, and by L1 in the transverse direction. Therefore, if a document of A2 is divided into two and the two halves are sequentially read, a strip-shaped region having a width corresponding to L1 is read twice. More specifically, when the upper half of the document is read as shown in FIG. 22b, the line denoted with S2 in the upper right of FIG. 17 is used as a reference line for matching the upper edge of the document (the reference position away from the operator), while a strip-shaped portion of width L1 from the lower edge (the edge near the operator) of platen glass 37 in FIG. 17 becomes an overlap region. If the lower half of the document is read as shown in FIG. 22c, the line denoted with S1 in the lower right of FIG. 17 is used as a reference line for matching the lower edge of the document (the reference position near the operator), and the strip-shaped portion of width L1 from the upper edge (edge away from the operator) of platen glass 37 in FIG. 17 becomes an overlap region. Note that document cover 28 is not shown in FIG. 17.

In the lower right of platen glass 37 in FIG. 17 is provided with an operation panel 31. The basic structure of operation panel 31 is the same as the first embodiment, and therefore, the same portions are denoted with the same reference numerals with detail description thereof being omitted.

Figure 16:
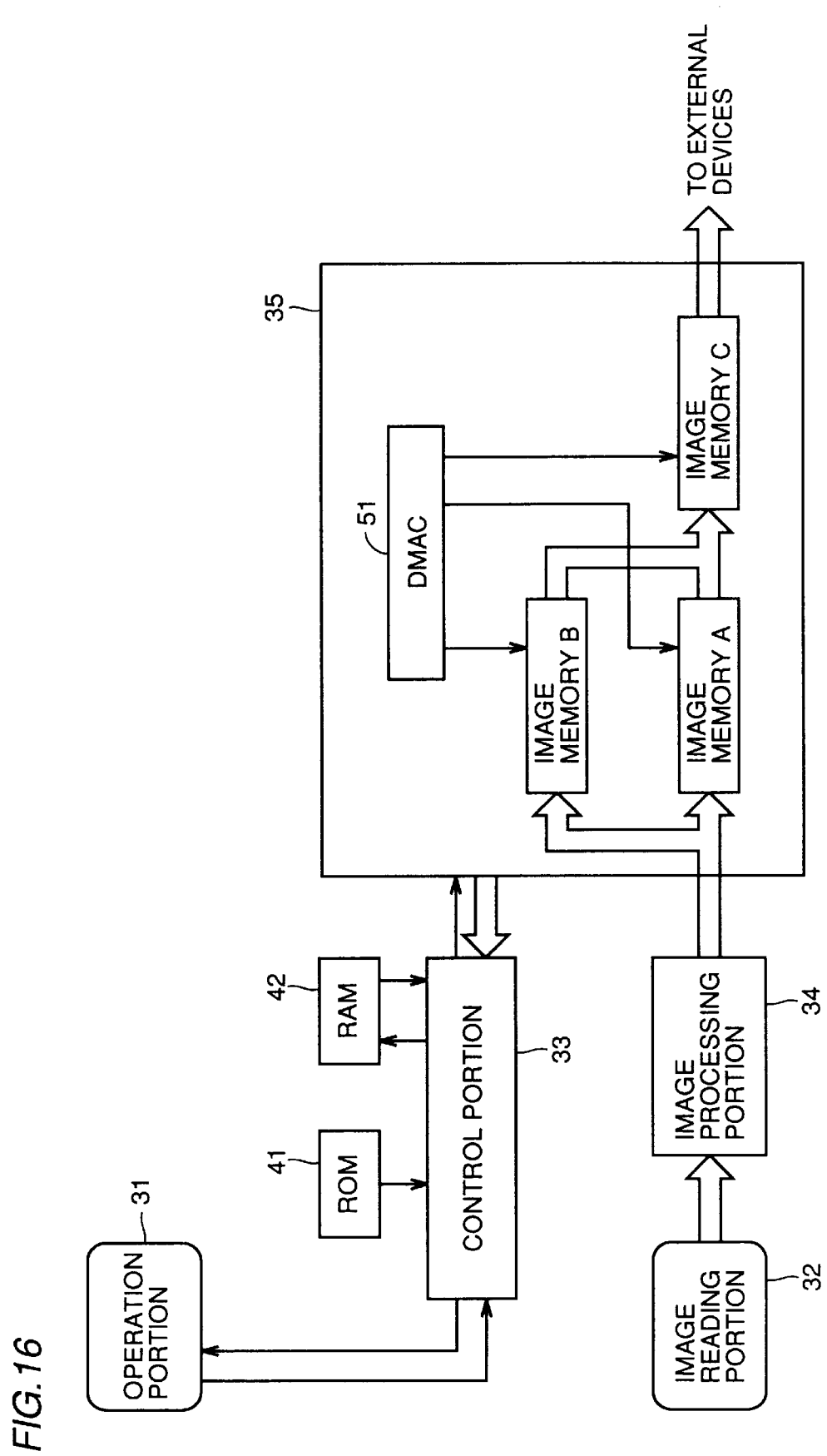
FIG. 16 is a block diagram showing the circuit configuration of an essential part of an apparatus according to a second embodiment of the invention.

FIG. 16 is a block diagram showing an essential part of an image combining portion in the second embodiment. The processing of combining two partial images by joining them in the above-described overlap region is carried out in image combining portion 35. Image combining portion 35 as shown in FIG. 16 has image memories A, B and C, and a DMAC (Direct Memory Access Controller) 51. Image combining portion 35 is controlled by a control portion 33 in the same manner as an image reading portion 32 and an image processing portion 34. Control portion 33 determines kinds of documents as will be described, detects offset of partial images in a large-size combination mode, and makes such a control that the offset is corrected at the time of combining the partial images by setting data in the DMAC 51 of image combining portion 35 based on the result of detection.

Image memory A stores image data read in a usual mode in the same manner as the first embodiment.

In the large size combination mode, the image data of the upper half of a document read at a reduction magnification for the first time is stored in image memory A, and the image data of the lower half of the document read at the reduction magnification for the second time is stored in image memory B.

As described above, the strip-shaped portion of width L1 from the edge near the operator of platen glass 37 becomes an overlap region at the time of reading the upper half of the document, while the strip-shaped portion of width L1 from the edge away from the operator of platen glass 37 becomes an overlap region at the time of reading the lower half of the document. The two images (the upper half image and the lower half image) are combined in the overlap region. In this combining operation, image data belonging to one of the partial images is selected by DMAC 51 and stored in image memory C.

The relation of pixel addresses are the same as the first embodiment, and therefore is not further detailed here.

The operation of the apparatus in the large-size combination mode according to the second embodiment will be described in conjunction with the flow charts in FIGS. 18 to 21. In the following, a document larger than A3 and equal to or smaller than A2, such as (newspaper, drafting, and other general documents) are divided into two at a reduction magnification and combined into image data of A3. The apparatus according to this embodiment particularly advantageously reduces offset of images when newspaper documents or drafting documents are read.

Figure 22A:
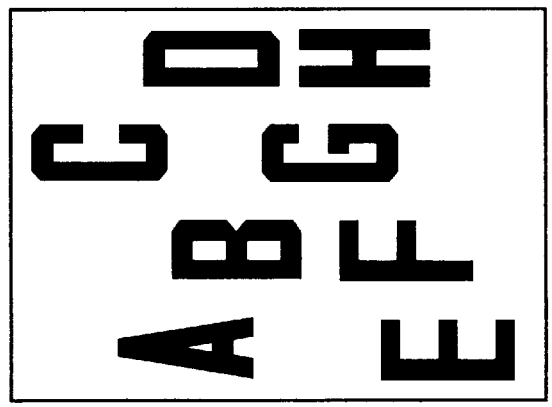

A large-sized document (as shown in FIG. 22a) is placed on platen 37 with the upper edge of the document being matched to reference position S2 away from the operator of platen 37, then the operator turns on start key 11 in the large-size combination mode (S31; YES), and reading magnification MAG, reading size SX in the X-direction, and reading size SY in the Y-direction are set as follows (S32):

MAG=1.0

SX=297 mm+L1

SY=420 mm+L2

More specifically, in the large-size combination mode, a preliminary scanning is carried out in response to an initial turning on of start key 11, in which a document corresponding to the entire readable region of platen 37 is read, and the read image is stored in image memory A (S33). For example, FIG. 24a shows image data obtained by setting the upper half of a document of newspaper on platen 37 as described above, covering it with document cover 28, and then reading the entire readable region of platen 37.

Figure 20:
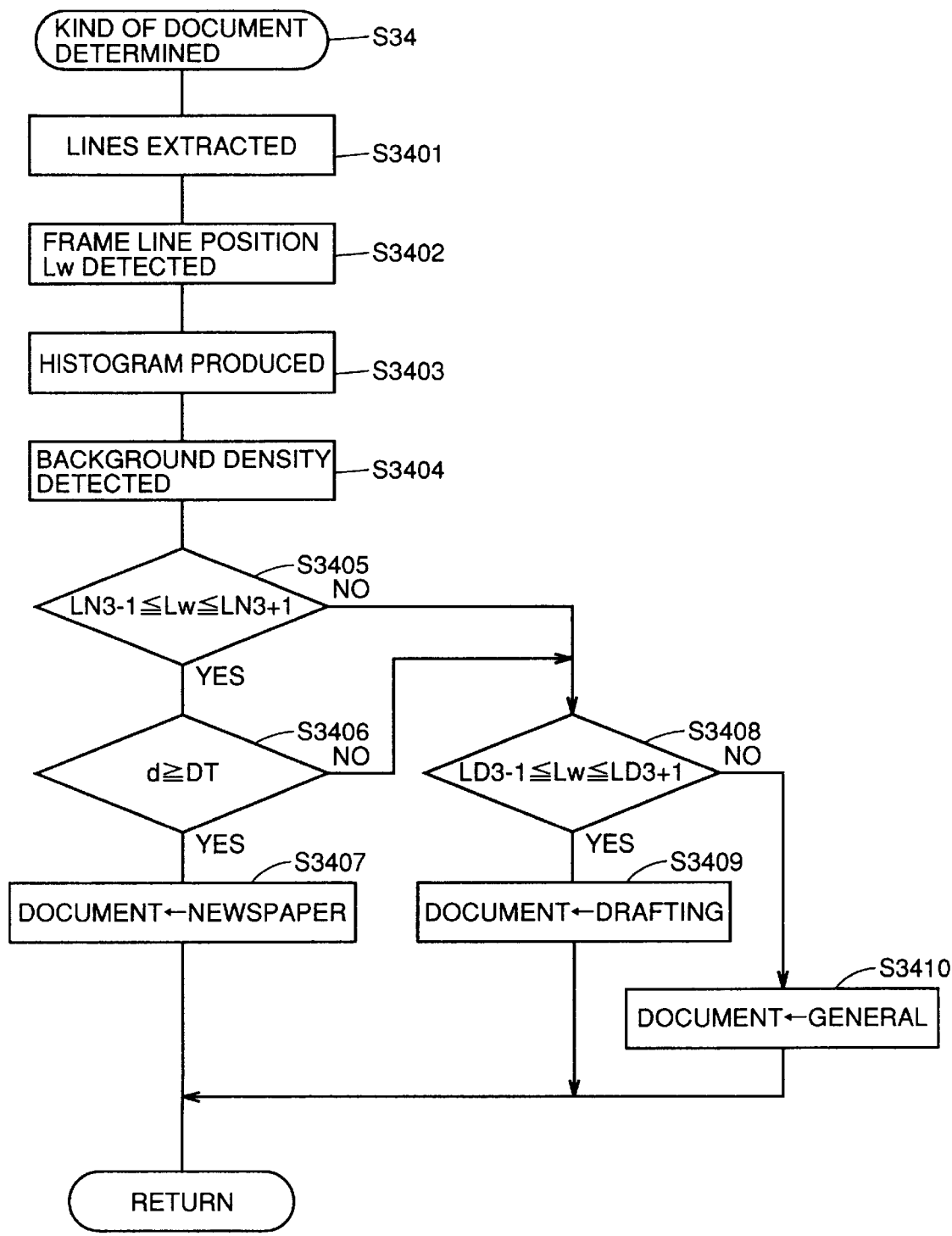
FIG. 20 is a flow chart for use in illustration of details of the processing of determining kinds of documents.

Then, based on the image data stored in image memory A, the kind of the document is determined (S34). Detail of this processing is shown in FIG. 20.

The image data stored in image memory A is first read out by control portion 33 (FIG. 16), and lines are extracted from the image data (S3401). FIG. 24b shows lines in the X-direction extracted from image data in FIG. 24a. The lines are extracted as a series of patterns longer than a prescribed length along the X-direction, thus extracted line data is stored in an RAM 42.

Then, based on the line data in the X-direction stored in RAM 42, the position of frame (outermost) line Lw is detected (3402). Position Lw can be detected as distance Lw from the reference position in the Y-direction (the right end of platen 37 in FIG. 17) to the line pattern closest thereto.

Figure 25:
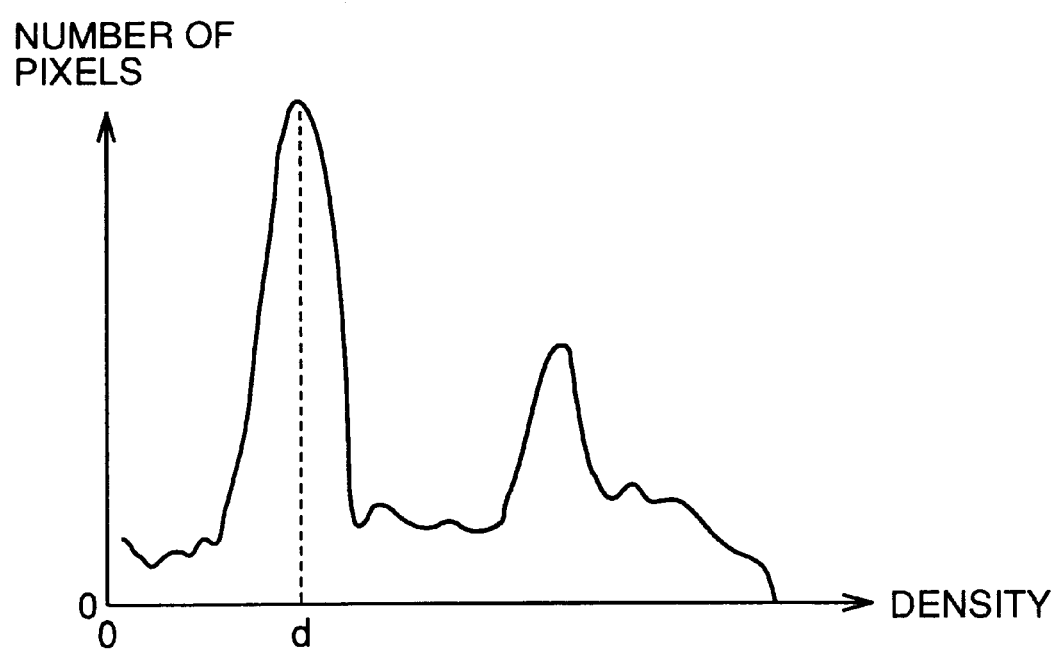
FIG. 25 is a graph showing an example of histogram produced in step S0403 in FIG. 20.

As for image data stored in image memory A, the number of pixels in each density is counted to produce a histogram (S3403). The density having a maximum number of pixels is detected as the background density d of the document (S3404). FIG. 25 shows an example of such histogram and background density d detected from the histogram.

Figure 23B:
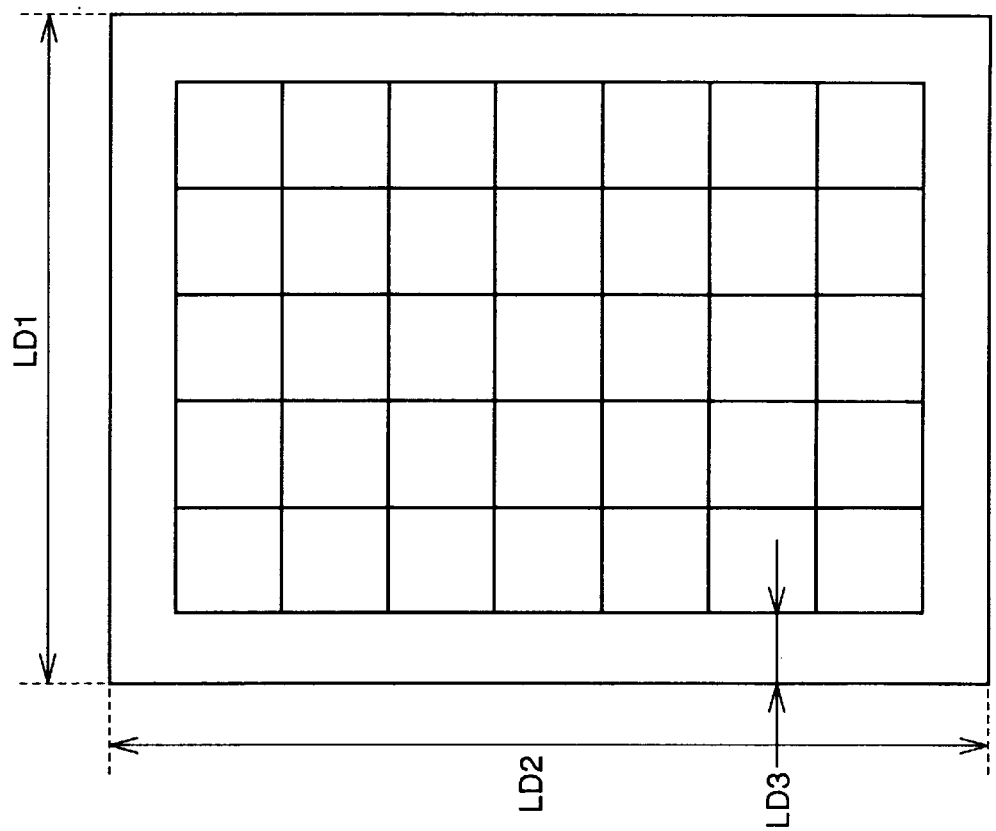
FIG. 23a shows a document from newspaper, with FIG. 23b showing a draft.
Figure 23A:
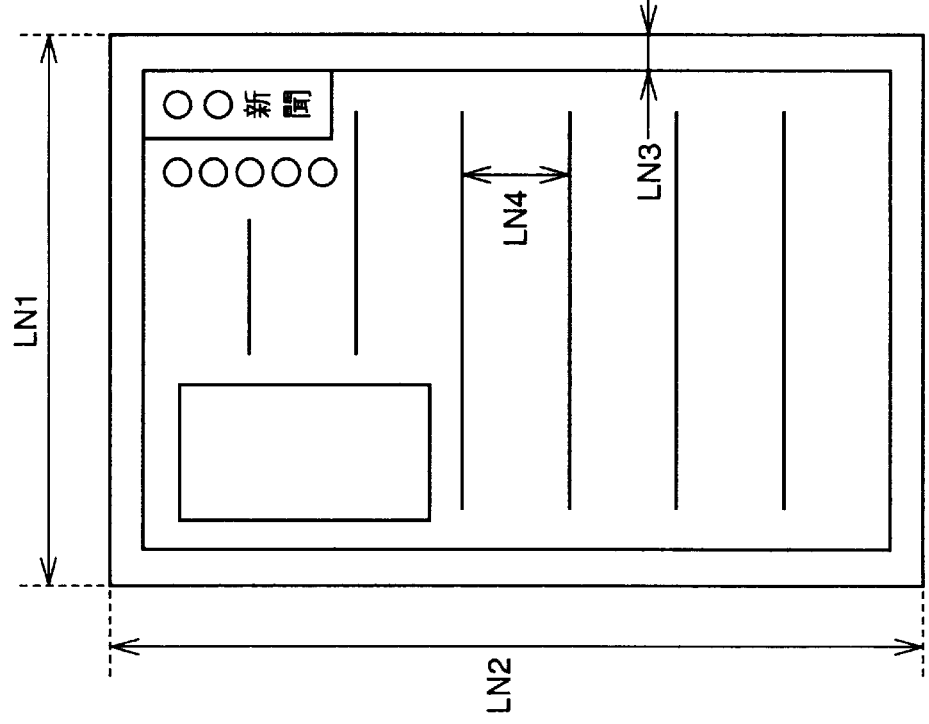

Based on thus detected frame line position Lw and background density d, it is determined if the document is from newspaper, drafting or a general document other than them. More specifically, as shown in FIGS. 23a, 23b, in the case of newspaper, the position of frame line in the X-direction is located at a distance of LN3 from the end of the document, and at distance LD3 in the case of the drafting. In the relation between background density DN of newspaper and the background density DD of drafting, DN>DD holds. Taking advantage of the fact, the following determination is made. Note that in FIGS. 23a, 23b, LN1 and LN2 represent the transverse size and the lengthwise size of the newspaper document, LD1 and LD2 represent the transverse size and the lengthwise size of the drafting document and LN4 is the interval between rules in rows in the newspaper document. The background density DN of the newspaper document is somewhat higher than white paper, and the background density DD of the drafting document is the density of the white paper.

If the detected frame line position Lw is as follows (S3405;YES):

(LN3−1) mm ≦ Lw ≦ (LN3+1) mm and the detected density d is represented as follows (S3406; YES, wherein DN≧DT>DD):

d>DT the document is determined to be a newspaper document and set accordingly (S3407).

If the detected frame line position Lw is as follows (S3408; YES):

(LD3−1) mm≦Lw≦(LD3+1) mm the document is determined to be a drafting document, and set accordingly (S3409).

If the detected frame line position Lw is neither represented as follows (S3405; NO):

(LN3−1) mm≦Lw≦(LD3+1) mm nor (LD3−1) mm≦Lw≦(LD3+1) mm (S3408;NO), the document is determined to be a general document, and set accordingly (S3410).

More specifically, if the detected frame line position Lw corresponds to the frame line position LN3 of the newspaper document and the detected background density d corresponds to the background density DN of the newspaper document, the document is determined to be of newspaper. If the detected frame line position Lw corresponds to the frame line position LD3 of drafting, the document is determined to be the drafting document. The case other than the above is determined to be a general document.

Note that instead of the processing in step S34 (FIG. 20), kinds of documents may be specified in response to an input from the operation panel.

Once the kind of the document is determined, the range of reading and reading magnification are set based on the kind of the document.

If, for example, the document is of newspaper, the shorter side size LN1 of the newspaper document is substituted to the shorter side size Lu1 of the document, and the longer side size LN2 of the newspaper document is substituted to the longer side size Lu2 of the document (S36). If the document is the drafting, the shorter side size LD1 of the drafting document is substituted to the shorter side size of the document Lu1, and the longer side size Lu2 of the drafting document is substituted to the longer side size Lu2 of the document (S37). In the case of a general document, the shorter side size Lu1 and the longer side size Lu2 of the document are input by the operator with operation panel 1 (S38).

The substituted shorter side size Lu1 and longer side size Lu2 are used to set the reading size SX in the X-direction, the reading size SY in the Y-direction, and the reading magnification MAG as follows (S39):

SX=(Lu2/2)+L1

SY=Lu1+L2

MAG=297 mm/Lu1

More specifically, the set reading range is wider than the size of half of the document in the X-direction by L1 and in the Y-direction by L2. The reading magnification is set so that the resultant combined image will have a size of A3.

With the reading range and the reading magnification being set, the image within the set range (SX×SY) is read at a set magnification, and stored in image memory A (S40). More specifically, the image data wider than the upper half of the document by L1 in the X-direction and by L2 in the Y-direction is stored in image memory A. Note that the reference position for the reading range in step S40 is the reference position S2 away from the operator.

Then, the operation waits until the start key is turned on for the second time (S41; NO). During this period, the operator places the lower half of the document on platen 37 with the lower edge of the document being matched at the reference position S1 near the operator.

After thus setting the document, the operator turns on the start key (S41; YES), and then the image within the same range (SX×SY) set in step S39 is read at the magnification set in step S39 and stored in image memory B (S42). More specifically, the image data larger than the lower half of the document by L1 in the X-direction and by L2 in the Y-direction is stored in image memory B. The reference position for the reading range in step S42 is the reference position S1 near the operator.

Figure 21:
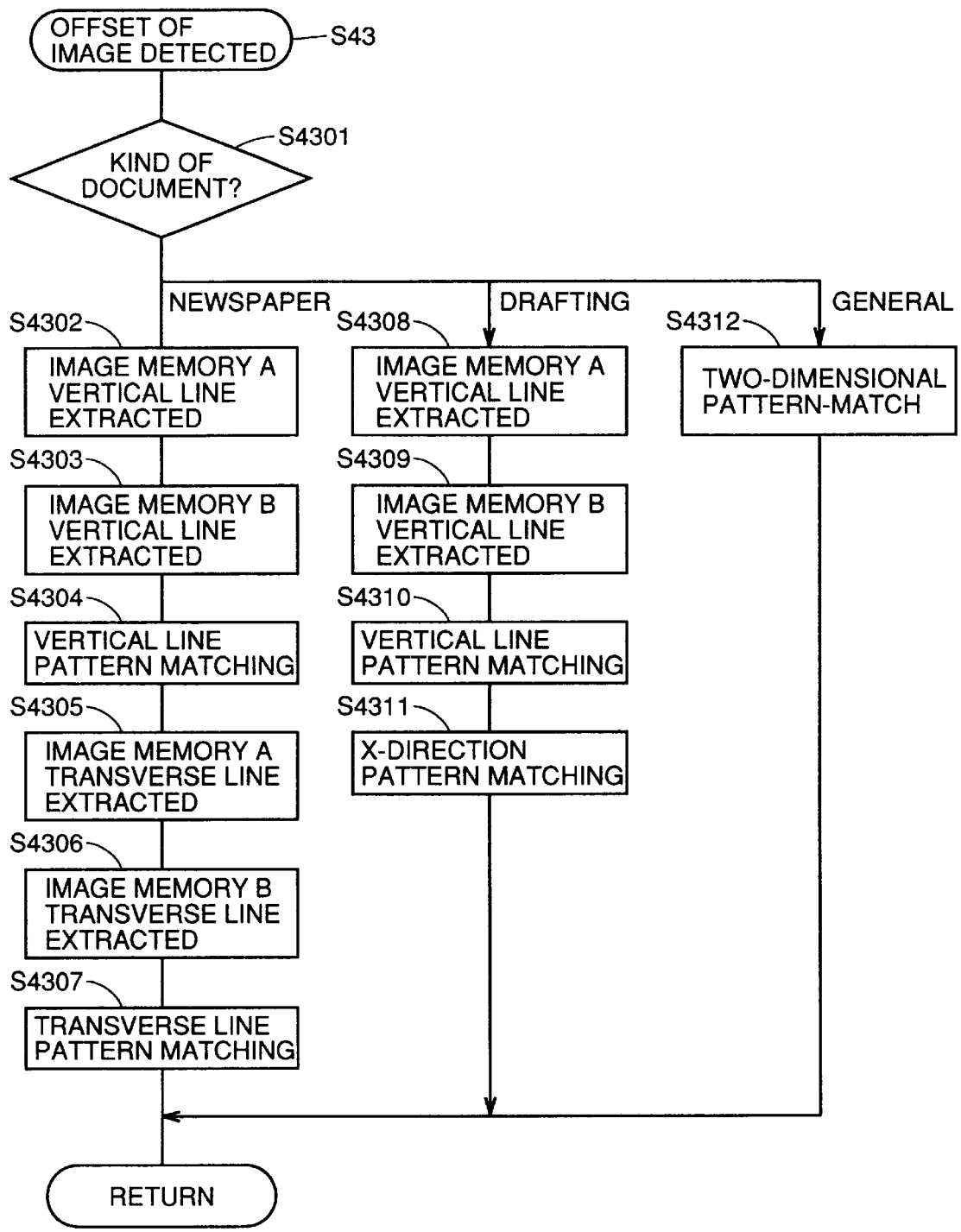
FIG. 21 is a flow chart for use in illustration of details of the processing of detecting image offsets.

The amount of offset between image data stored in image memory A and the image data stored in image memory B is detected (S43). The processing details of which are shown in FIG. 21 is carried out taking advantage of the characteristic of the kind of the document.

In the case of the newspaper document, the amount of offset of images in the Y-direction Ly is detected (S4302 to S4304) at first. More specifically, the line pattern in the X-direction of the image data on the upper half read out from image memory A and the line pattern in the X-direction of the image data on the lower half read out from memory B are pattern-matched in the Y-direction, in order to detect the amount of offset Ly of the images in the Y-direction. Herein the line pattern in the X-direction is the same as that in step 3401 at the time of preliminary scanning and is shown in FIG. 24b.

Then, the amount of offset of images in the X-direction Lx is detected (S4305 to S4307). The line pattern in the Y-direction of the image data on the upper half read out from image memory A and the line pattern in the Y-direction of the image data on the lower half read out from image memory B are subjected to pattern matching in the X-direction, and thus the amount of offset of images in the X-direction is detected.

Note that the amount of offsets Ly and Lx in these Y- and X-directions both take a positive value if the image data from image memory A is offset from the image data in image memory B in their respective+direction.

In the case of the drafting document, the amount of offset of images in the Y-direction Ly is detected first (S4038 to S4310). As the case with the above-described newspaper document, the line pattern in the X-direction of the image data on the upper half side read out from image memory A and the line pattern in the X-direction of the image data on the lower half side read out from image memory B are subjected to pattern matching in the Y-direction, and thus the amount of offset of images in the Y-direction Ly is detected.

Then, the amount of offset of images in the X-direction is detected (S4311). More specifically, the image data on the upper half side read out from image memory A and the image data on the lower half side read out from image memory B are subjected to pattern matching in the X-direction, and the amount of offset of images in the X-direction Lx is detected. The pattern matching in the X-direction is carried out with respect to the region of width L1×2 (as shown in FIG. 10a) after the amount of offset in the Y-direction Ly is corrected. More specifically, control portion 33 reads out the image data in the region of width L1×2 from the bottom out of the image data on the upper half side and binarizes the data, and the data is stored in RAM 42

(hereinafter referred to as "partial data of A"). Similarly, the image data in the region of width L1×2 from the top of the image data on the lower half side of the document is read out and binarized, and then stored. Then, the binarized data is shifted in the Y-direction by the amount of offset Ly (hereinafter referred to as "partial data of B"). The "partial data of B" and the "partial data of A" are subjected to pattern matching in the X-direction, so that the amount of offset in the X-direction Lx is detected.

In the case of a general document, the amounts of offset of images in both X- and Y-directions Lx and Ly are detected by two-dimensional pattern matching of the image data on the upper half side read out from image memory A and the image data on the lower half side read out from image memory B (S4312). The two-dimensional-pattern matching is carried out with respect to the region of width L1×2 as the case with the pattern matching in the X-direction described above. Control portion 33 reads out the image data in the region of width L1×2 from the bottom out of the image data on the upper half side of the document and binarizes the data, and stores the data in RAM 42. (hereinafter referred to as "partial data of A"). Similarly, the image data in the region of width L1×2 from the top out of the image data on the lower half side of the document is read out and binarized, and then stored in RAM 42 (hereinafter referred to as "partial data of B"). The partial data of B and the partial data of A are subjected to two-dimensional-pattern-matching, and the amounts of offset in the X- and Y-directions Lx and Ly are detected. As such two-dimensional-pattern-matching, a known method may be employed, an example of which will be described later.

As in the foregoing, once the amount of offset Lx and Ly of the images from image memory A and image memory B in both directions are detected through the selective processing based on kinds of documents, the image data is shifted to correct the offset amounts Lx and Ly and combined. More specifically, by the function of control portion 33, correction amounts Cay and Cax in the Y- and X-directions for the data in image memory A and correction amounts Cby and Cbx in the Y- and X-directions for the data in image memory B are set in DMAC (Direct Memory Access Controller) 51. These amounts of correction can be produced based on the amounts of offset Lx and Ly detected in step S43;

$$Cay = -Ly/2$$

$$Cax = -Lx/2$$

$$Cby = Ly/2$$

$$Cbx = Lx/2$$

Now, based on the amounts of correction (shift amounts) set as described above, DMAC 51 controls reading of data from image memory A and image memory B, and thus combined image data is stored in image memory C. The image data in image memory C is output to external devices (such as printer and facsimile), and used for image forming processings in such external devices.

An example of pattern matching executed in steps S4311 and S4312 will be detailed in conjunction with FIGS. 26 and 27. FIGS. 26 and 27 show the processing of extracting feature particles within the overlap region of two partial images IMA and IMB, and combining these two partial images IMA and IMB using a segment connecting their barycenters as a joining line.

After the densities of these partial images are made equal, the image data in the overlap region is each binarized. Particle cutting is carried out to extract two particles in both overlap regions. The particle cutting is the processing of limiting the number of pixels within the region in which the binarized image is represented in particles to a specified range, thereby finally extracting two particles.

Figure 27A:
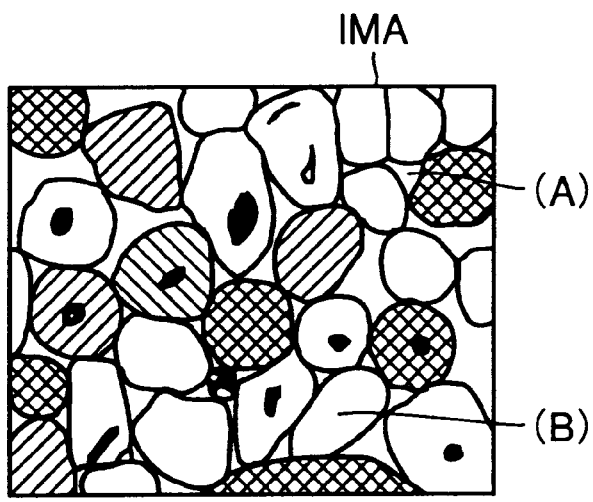
FIGS. 27a, 27b, and 27c show the processing of extracting two feature particles.
Figure 27B:
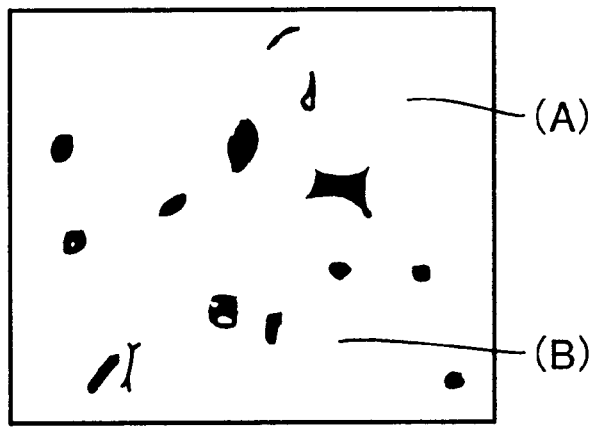
Figure 27C:
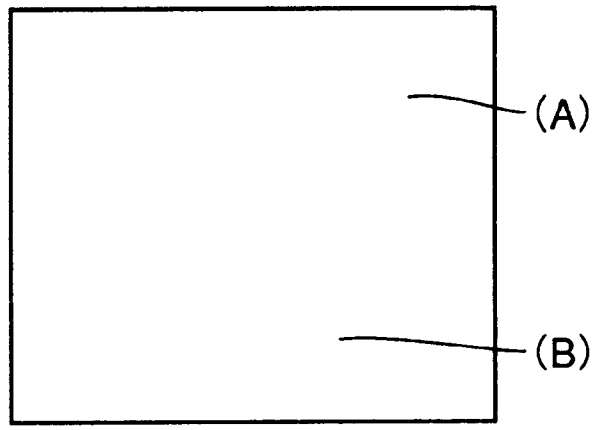

If, for example, FIG. 27a is binarized, an image including a plurality of particulate portions as shown in FIG. 27b is obtained. In the image, the number of pixels forming particulate portions is counted, and particulate portions each formed of a number of pixels within a specified range are extracted. If the number of thus extracted particulate portions is larger than 2, the specified range is further narrowed and the same processing is repeated. The processing is repeated while narrowing the specified range until finally the two particles are extracted. FIG. 27c shows two extracted feature particles A and B.

Figure 26A:
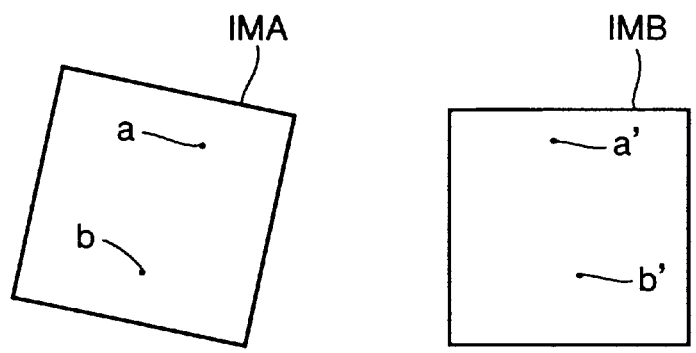
FIGS. 26a, 26b and 26c show the processing of combining two partial images based on two extracted feature particles.
Figure 26B:
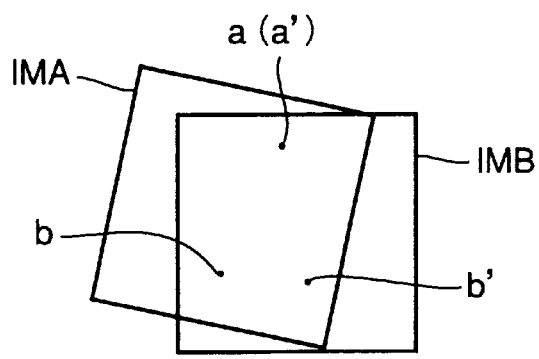
Figure 26C:
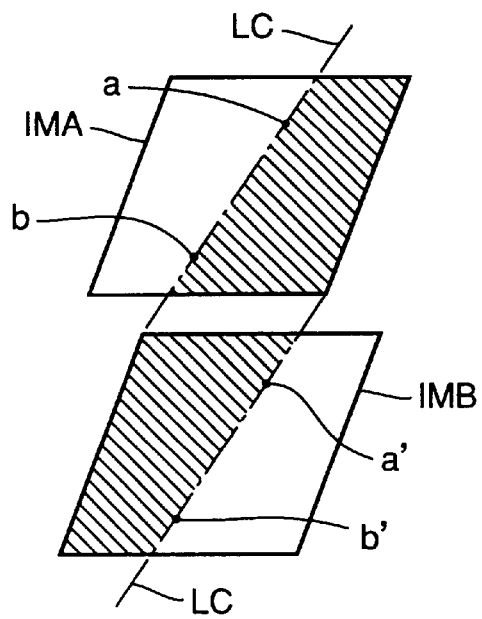

Once the two feature particles are extracted, the barycenter coordinates of these feature particles are produced FIG. 26a shows the barycenter coordinates a, b, a', b' of feature particles each produced in the overlap regions of the two partial images IMA and IMB. Using the barycenter coordinates, the two partial images IMA and IMB are joined so that a segment "a-b" connecting the barycenter coordinates in the partial image IMA and a segment "a'-b'" connecting the barycenter coordinates in the partial image IMB match with each other. More specifically, at least one of the two partial images IMA and IMB is shifted and/or turned as shown in FIG. 26b so that these two segments match, and the two partial images IMA and IMB are joined as shown in FIG. 26c using the segments as boundaries. Any of the shadowed portions in FIG. 26c may be used to join the two partial images IMA and IMB, or the segments may be used as the joining line to join these two partial images IMA and IMB.

Thus, the pattern matching in steps S4311 and S4312 as well as joining of the images based thereon may be carried out.

(3) Third Embodiment

Figure 29:
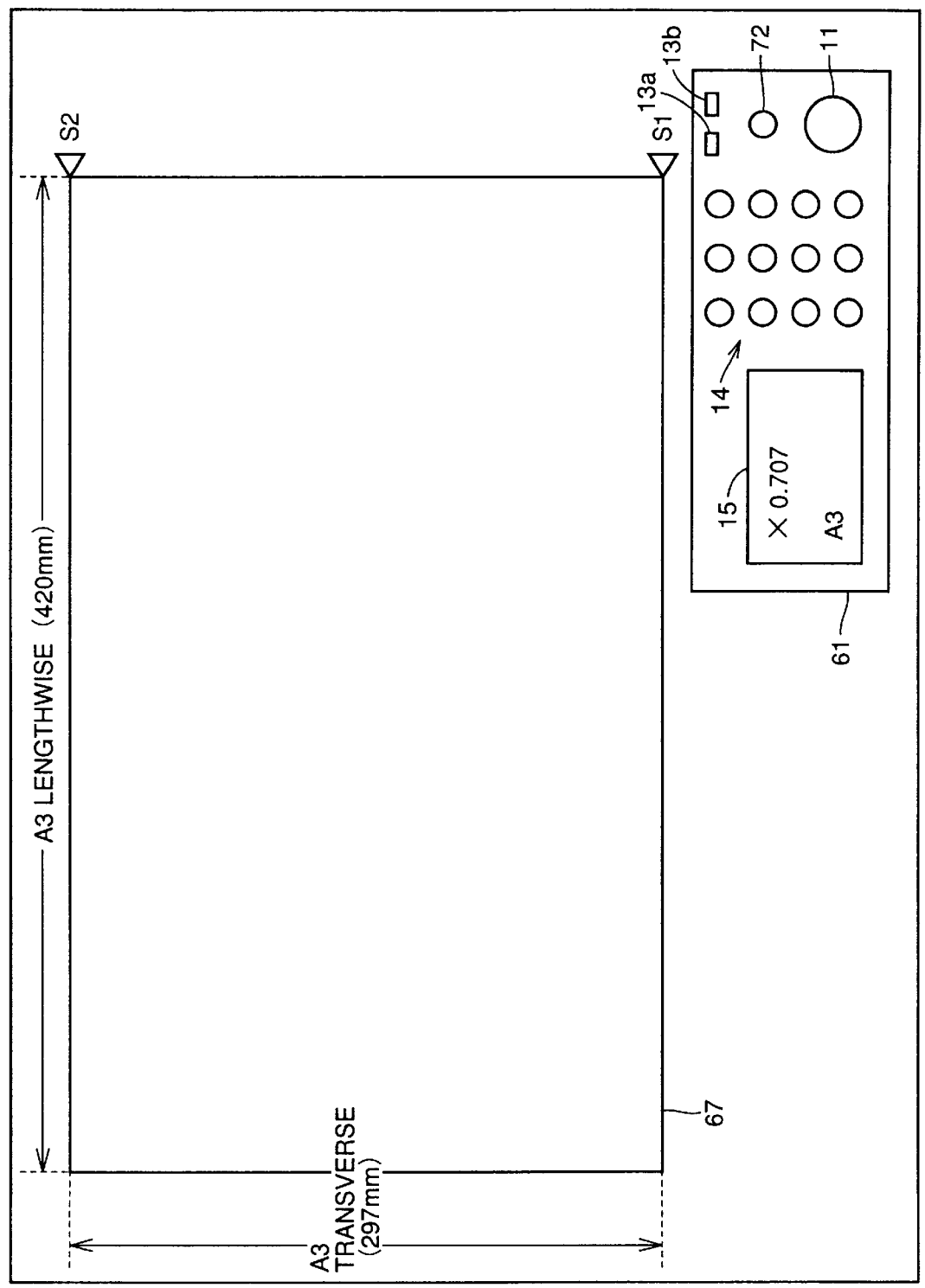
FIG. 29 shows an operation panel and a platen in the apparatus according to the third embodiment.

A third embodiment of the invention will be described. The basic configuration of the third embodiment is the same as the second embodiment, and therefore only differences will be described. Platen glass 67 is of A3 as shown in FIG. 29. Therefore, a document of A1 may be divided into 4 and read, and the image data of the entire document can be obtained. This apparatus permits an arbitrary direction of reading, for example, all the partial images may be set in the same direction for reading (as shown in FIGS. 31a to 31d), or two partial images A and B in the upper half may be turned by 180° from two partial images C and D in the lower half in the directions of reading (as shown FIGS. 33a to 33d). The order of reading the partial images is not limited to those shown in FIGS. 31a to 31d, 33a to 33d, but any arbitrary order may be employed. In FIGS. 31a to 31d, 33a to 33d, each partial image is on the back surface (the side facing platen 67), and the shown pattern is by a perspective view from the top.

As shown in FIG. 29, an operation panel 61 is provided in the lower right of platen glass 67 in the figure. The basic structure of operation panel 61 is the same as the second embodiment, and therefore only different portions will be described. Operation panel 61 includes a mode key 72 for instructing switching between usual mode, 2-part-large-size-combination mode, and 4-part-large-size-combination mode, a 2-part-large-size-mode indication lamp 13a indicating that the 2-part-large-size-combination mode is set by illumination, and a 4-part-large-size-mode indication lamp 13b indicating that the 4-part-large-size-combination mode is set by illumination.

In the 2-part-large-size-combination mode, a document having a size larger than A3 and equal to or smaller than A2 is divided into two and read at a reduction magnification, a single image equal to or smaller than A3 is formed by joining the read images and output. In the 4-part-large-size-combination mode, a document having a size larger than A2 and equal to or smaller than A1 is divided into 4 and read at a reduction magnification, and a single combined image equal to or smaller than A3 in size is produced by joining the read images and output. Note that the 4-part-large-size-combination mode will be mainly described in the following.

The processing of combining partial images by joining them is carried out in an image combining portion 65. Image combining portion 65, as shown in FIG. 28, includes image memories (1), (2), (3), (4) and (5), and a DMAC 66. Image combining portion 65 is controlled by a control portion 63 in the same manner as an image reading portion 62 and an image processing portion 64. Control portion 63 determines the direction of setting a document at the time of reading the image and the order of reading partial images, sets data in the DMAC 66 of image combining portion 65 based on the result and permits the partial images to be arranged at correct positions and in correct directions.

Image memory (1) stores image data read in the usual mode. In the 2-part-large-size-combination mode, image data read at a reduction magnification for the first time is stored in image memory (1), and image data read at the reduction magnification for the second time is stored in image memory (2). In the 4-part-large-size-combination mode, image data read at a reduction magnification for the first time is stored in image memory (1), and image data read at the reduction magnification for the second time is stored in image memory (2), image data read at the reduction magnification for the third time is stored in image memory (3), and image data read at the reduction magnification for the fourth time is stored in image memory (4).

The partial image data stored in image memories (1) and (2) in the 2-part-combination mode or the partial image data stored in image memories (1), (2), (3) and (4) in the 4-part-combination mode are combined by storing the image data of each image memory in a specified address in image memory (5) (addresses corresponding to arrangement positions A to D in the combined image; turned if necessary) under the control of DMAC 66. The data therefor is set by control portion 63 as follows.

Though not specifically described in conjunction with this embodiment, if the boundary of partial images is read a number of times and the partial images are joined along the joining line within an overlap region (one of the overlap portions is employed), the addresses of corresponding portions in image memories (1) to (4) should be made common as for each pixel in the overlap region.

Image memory (5) may store image data equal to or smaller than size A3. In the usual mode, image data from image memory (1) is transferred and stored therein. In the 2-part-large-size-combination mode, a combined image resulting from images in image memories (1) and (2) is stored. In the 4-part-large-size-combination mode, a combined image resulting from images in image memories (1), (2), (3) and (4) is stored. The image data in image memory (5) is output to external devices such as printer and facsimile (not shown), and used for image forming operation in such external devices.

Figure 30A:
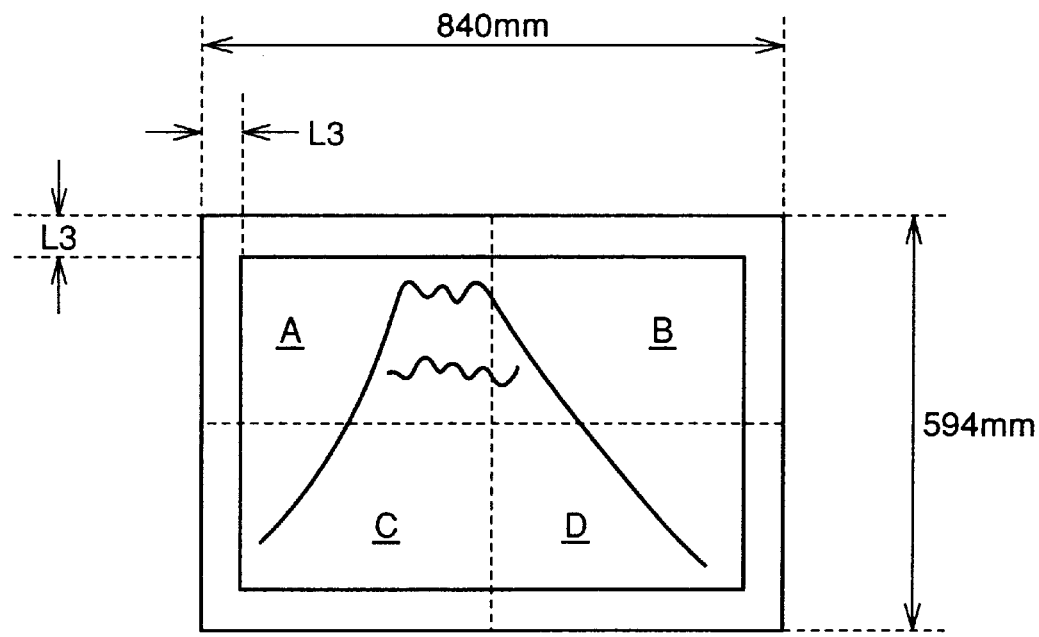
Figure 30B:
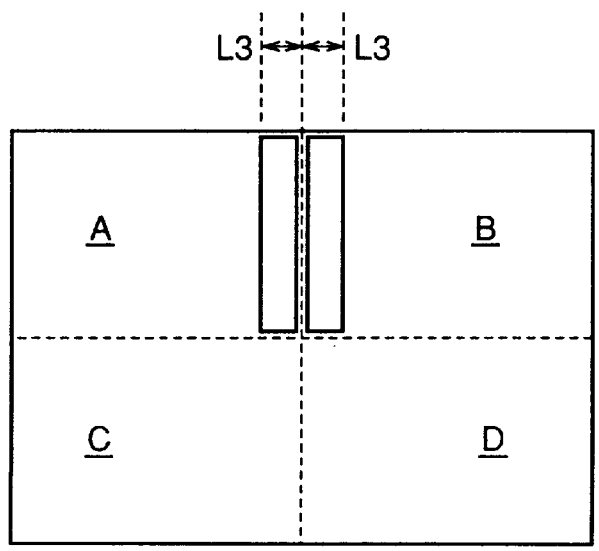
Figure 31A:
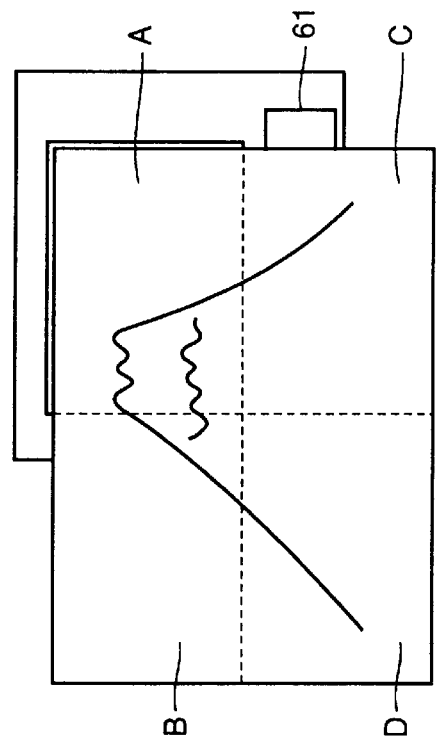
FIGS. 31a to 31d show an example of a how four partial regions of a large-sized document are read in the same direction.
Figure 31B:
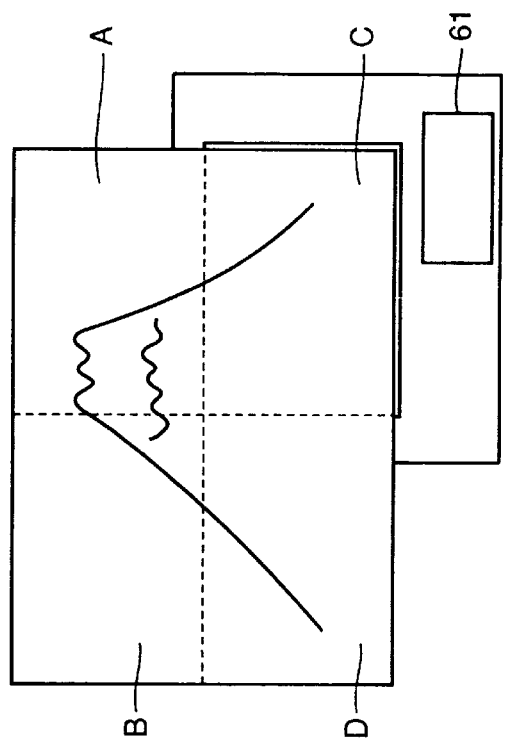
Figure 31C:
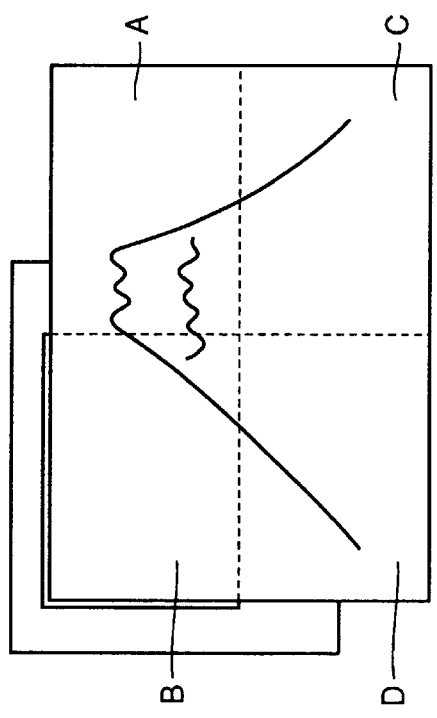
Figure 31D:
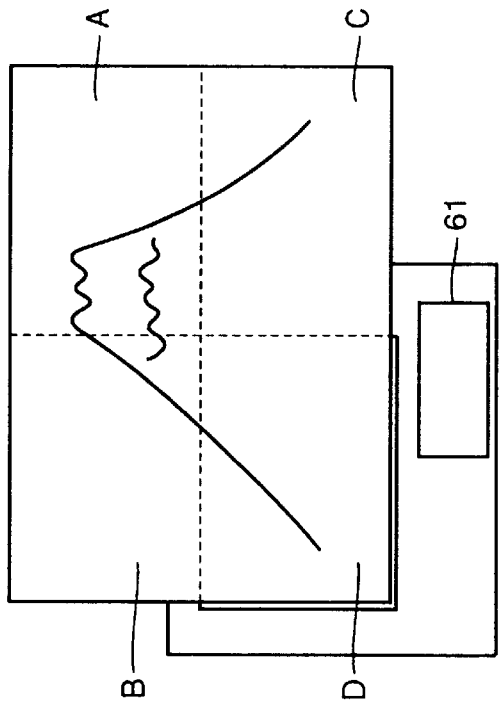
Figure 32A:
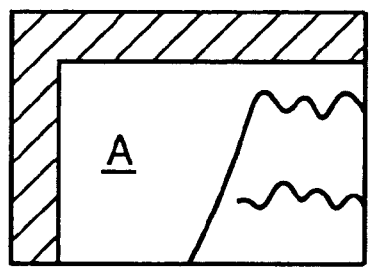
FIGS. 32a to 32d show the partial images read according to the method in FIG. 31.
Figure 32B:
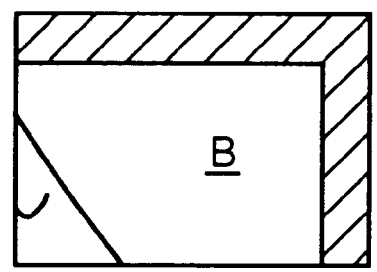
Figure 32C:
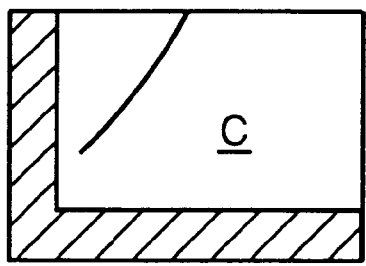
Figure 32D:
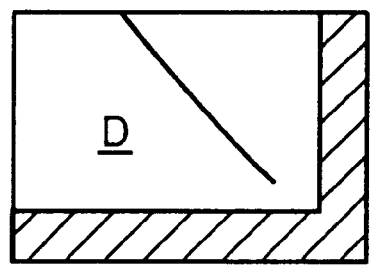
Figure 33A:
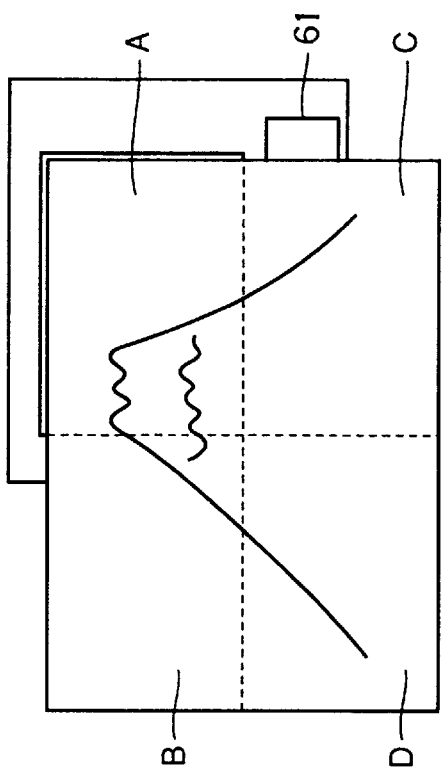
FIGS. 33a to 33d show an example of how four partial regions of a large-sized document are read with its lower half and its upper half being turned 180° from each other.
Figure 33B:
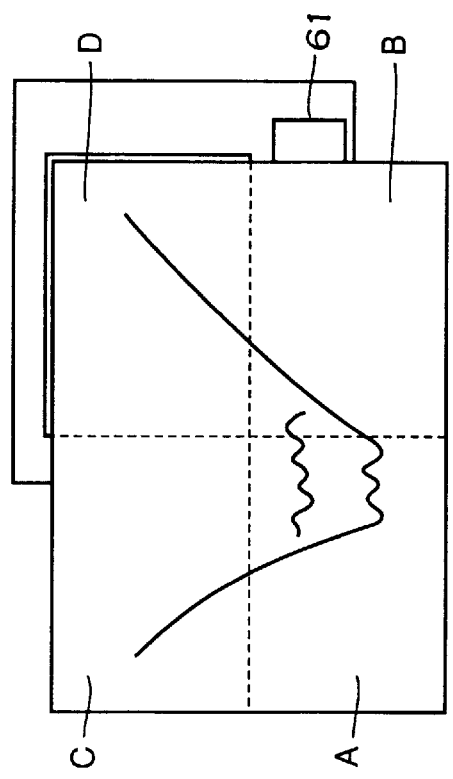
Figure 33C:
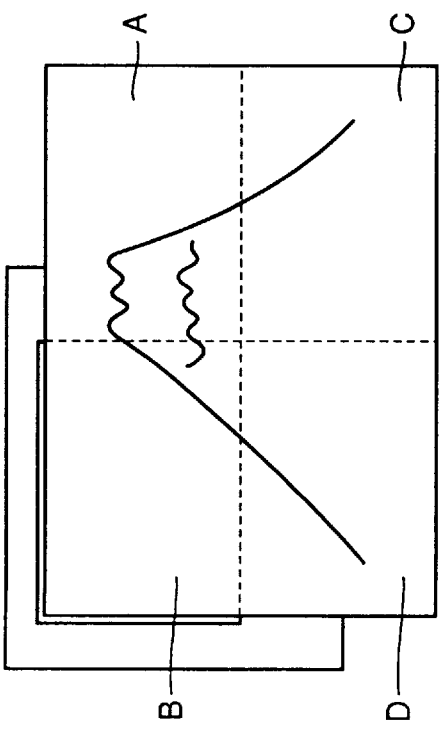
Figure 33D:
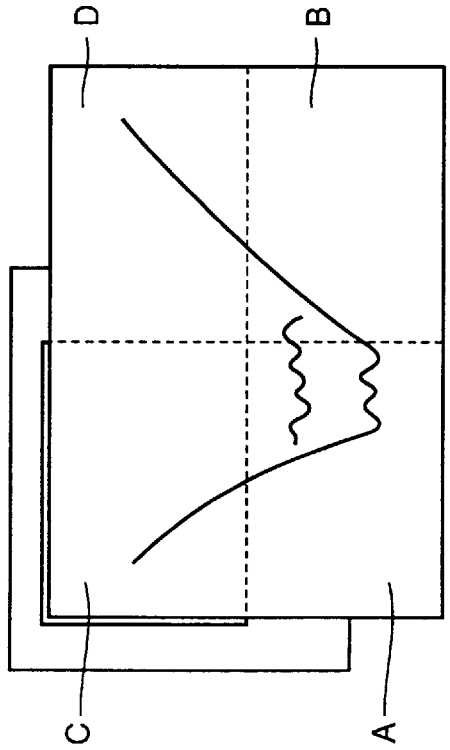
Figure 34A:
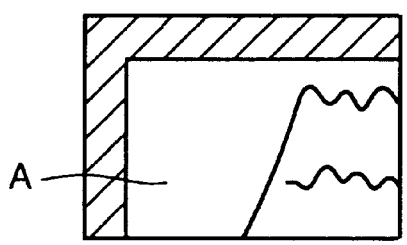
FIGS. 34a to 34d show the partial images read by the method shown in FIG. 33.
Figure 34B:
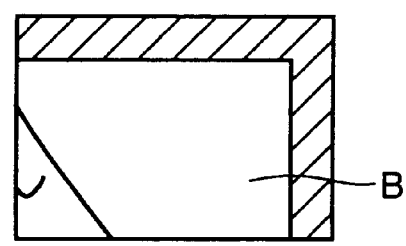
Figure 34C:
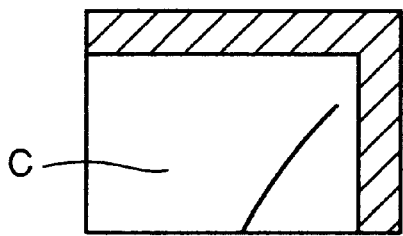
Figure 34D:
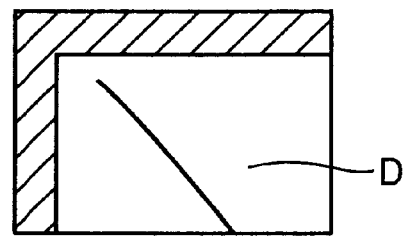
Figure 35:
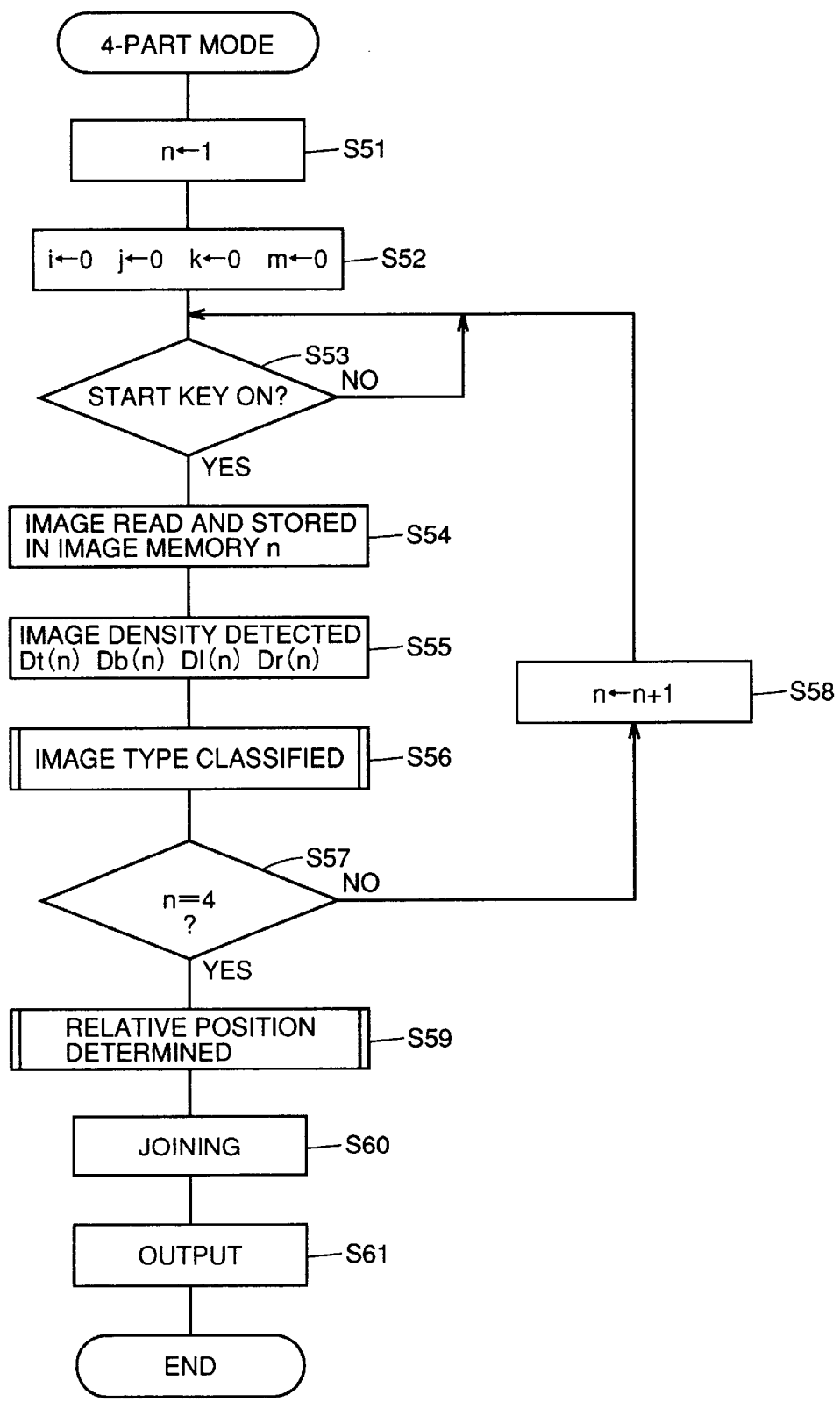
FIG. 35 is a flow chart for use in illustration of a processing in a 4-part large-size combination mode in the apparatus according to the third embodiment.

The operation in the 4-part-large-size-combination mode in this apparatus will be described in conjunction with the flow charts in FIGS. 35 to 38. In an illustrated case as shown FIG. 30a, a document of A1 (840 mm×594 mm) is divided into 4 partial images A, B, C and D each of which is read at a reduction magnification of 0.5 (0.25 times in area ratio), and a combined image data having a size of A3 is produced by joining the 4 partial image data. The document has an encircling space of width L3, and images similar to each other exist in the portions of width L3 near the boundary between adjacent partial images (see FIG. 30b) in the figure. Partial image A is located in the upper left, partial image B in the upper right, partial image C in the lower left, and partial image D in lower right.

Principles of Operation

As a method of sequentially reading 4 images divided from a document, there are the method shown in FIGS. 31a–31d and the method shown in FIGS. 33a–33d. According to the method shown in FIGS. 31a–31d, four partial images A, B, C and D are set on platen 67 in an arbitrary order such that all the partial images are directed in the same direction. More specifically, partial images A, B, C and D are set such that their tops and bottoms are directed in the correct direction in view of the operator. Note that partial images A, B, C and D may be set so that they are directed in the direction 180° reverse in view of the operator. Meanwhile, according to the method as shown in FIGS. 33a to 33d, the partial images are set on platen 67 in an arbitrary order so that partial images A and B, and partial images C and D are directed in opposite directions with an angle difference of 180°. More specifically, partial images A and B are set with their tops and bottoms directed in the correct direction in view of the operator, while partial images C and D are set in the reverse direction with their tops and bottoms turned by 180° in view of the operator. Note that the relation may be reversed.

Partial images A, B, C and D read according to the method shown in FIGS. 31a–31d are illustrated in FIGS. 32a–32d, while partial images A, B, C and D read according to the method shown in FIGS. 33a–33d is illustrated in FIGS. 34a–34d. As shown in the image read according to the method shown in FIGS. 31a–31d, the surrounding space of the document is positioned on the upper side and left side in partial image A, on the upper side and right side in partial image B, on the lower side and the left side in partial image C, and on the lower side and right side in partial image D. Meanwhile, the image read according to the method in FIGS. 33a–33d, the spaces are in the same positions as the image read according to the method in FIG. 31 in partial images A and B, but positioned on the upper side and the right side in partial image C and on the upper side and left side on partial image D.

More specifically, according to the method shown in FIGS. 31a–31d, the positions of the spaces vary among the partial images while according to the method shown in FIGS. 33a–33d, two partial images A and D have the spaces in their upper sides and left sides, and two partial images B and C have spaces in their upper sides and right sides. As described above, images in the vicinity of the sides to be joined are similar to each other between adjacent partial images. The apparatus according to this embodiment specifies which one of the four partial images A, B, C and D is stored in image memories (1), (2), (3) and (4) in the order they are read, as well as specifies the direction of storing each partial image in each image memory, and joins the 4 partial images based on the specified result.

Now, steps in each operation will be described. If the 4-part-mode is set, an initial value "1" is set for a variable n indicating the number of reading (S51). An initial value "0" is set for each of variable i, j, k and m (S52). Variables i, j, k and m are used in the image type classification processing which will be described later (S56/FIG. 36).

Then, the apparatus waits until start key 11 is turned on by the operator (S53).

Once the operator sets any of partial images of a document on platen 67 and turns on start key 11 (S53; YES), the partial image of the document set on platen 67 is read at a magnification of 0.5, and stored in image memory (n) (S5). For the first time, since n=1, the read image is stored in image memory (1).

Then, the image densities of strip-shaped portions of width L3 at the surrounding 4 sides of the partial image stored in image memory (n) are detected, the image density of the strip-shaped portion of the upper side is set for variable Dt(n), the image density of the strip-shaped portion of the lower side for variable Db(n), the image density of the strip-shaped portion of the left side for variable Dl(n), and the image density of the strip-shaped portion of the right side is for variable Dr(n) (S55). Since n=1 for the first time, the image densities of the surrounding four sides of the partial image stored in image memory (1) are set to variables Dd(1), Db(1), Dl(1), and Dr(1), respectively. The image density herein is calculated by reading out pixels of the strip-shaped portion of a side on a one-pixel-basis, counting the number of pixels having a density higher than a prescribed density Dt as a threshold value, and dividing the number of pixels with higher densities than Dt by the total number of pixels of the strip-shaped portion of the side. More specifically, it is produced as a value indicating the ratio of the area of the image other than the background portion of the strip-shaped portion of the side. If the image density is smaller than a prescribed threshold value DO, a strip-shaped portion is determined to be a blank space (see FIG. 36). Note that affixes t, b, l and r indicate top, bottom, left, and right, respectively.

Figure 36:
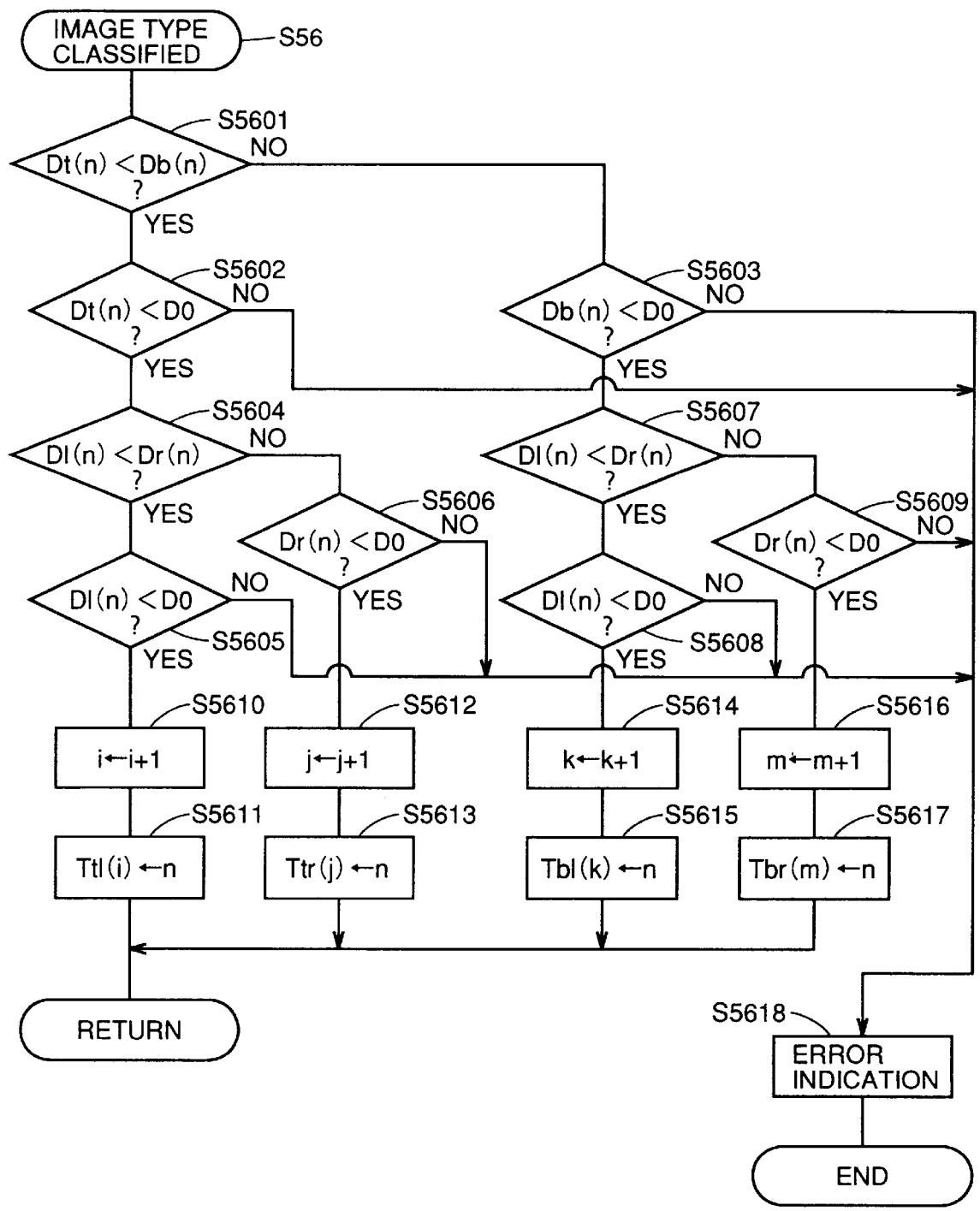
FIG. 36 is a flow chart for use in illustration of details of the processing of classifying types of images in FIG. 35.
Figure 37:
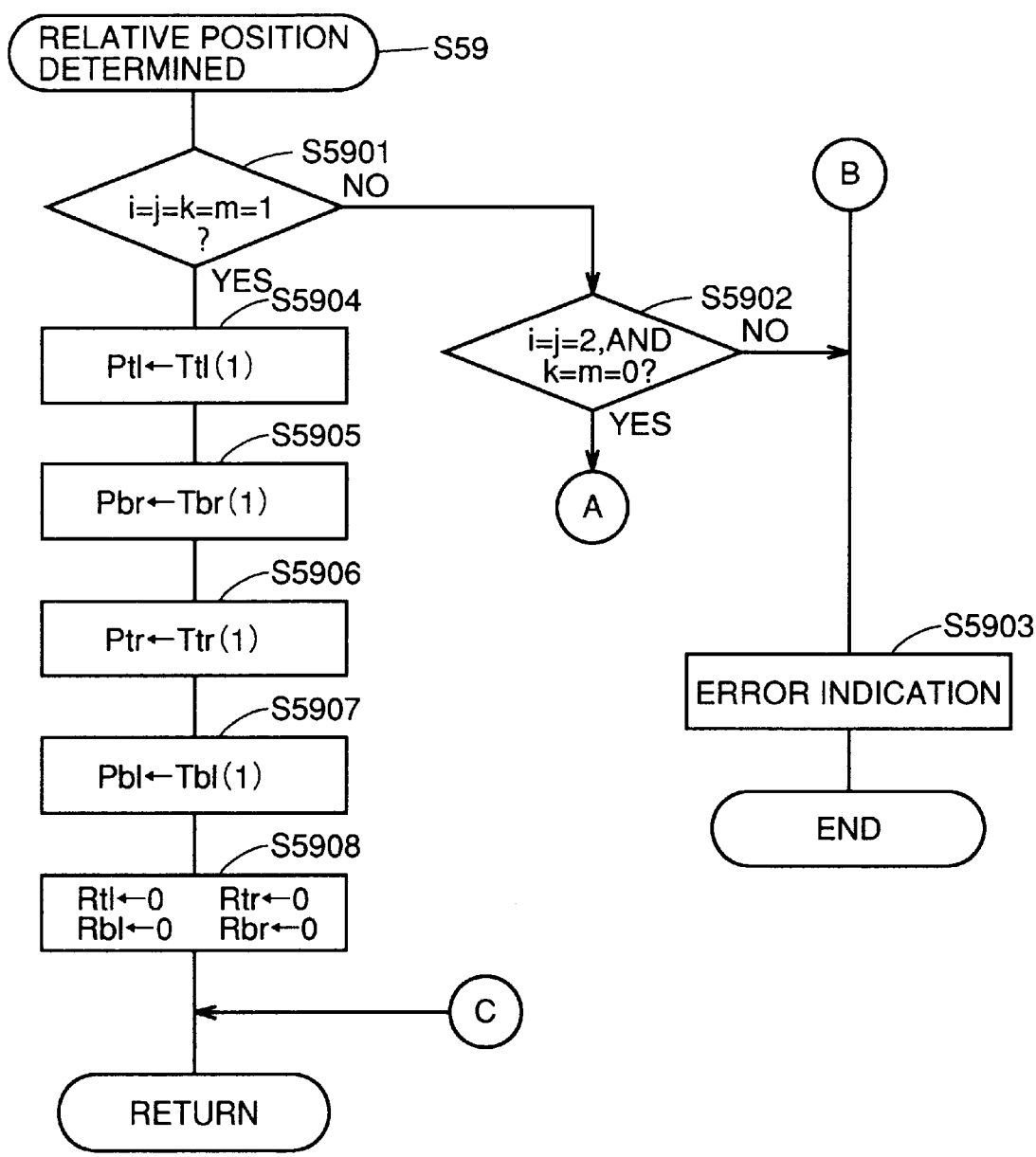
FIG. 37 is a flow chart for use in illustration of part of details of a relative position determining processing in FIG. 35.
Figure 38:
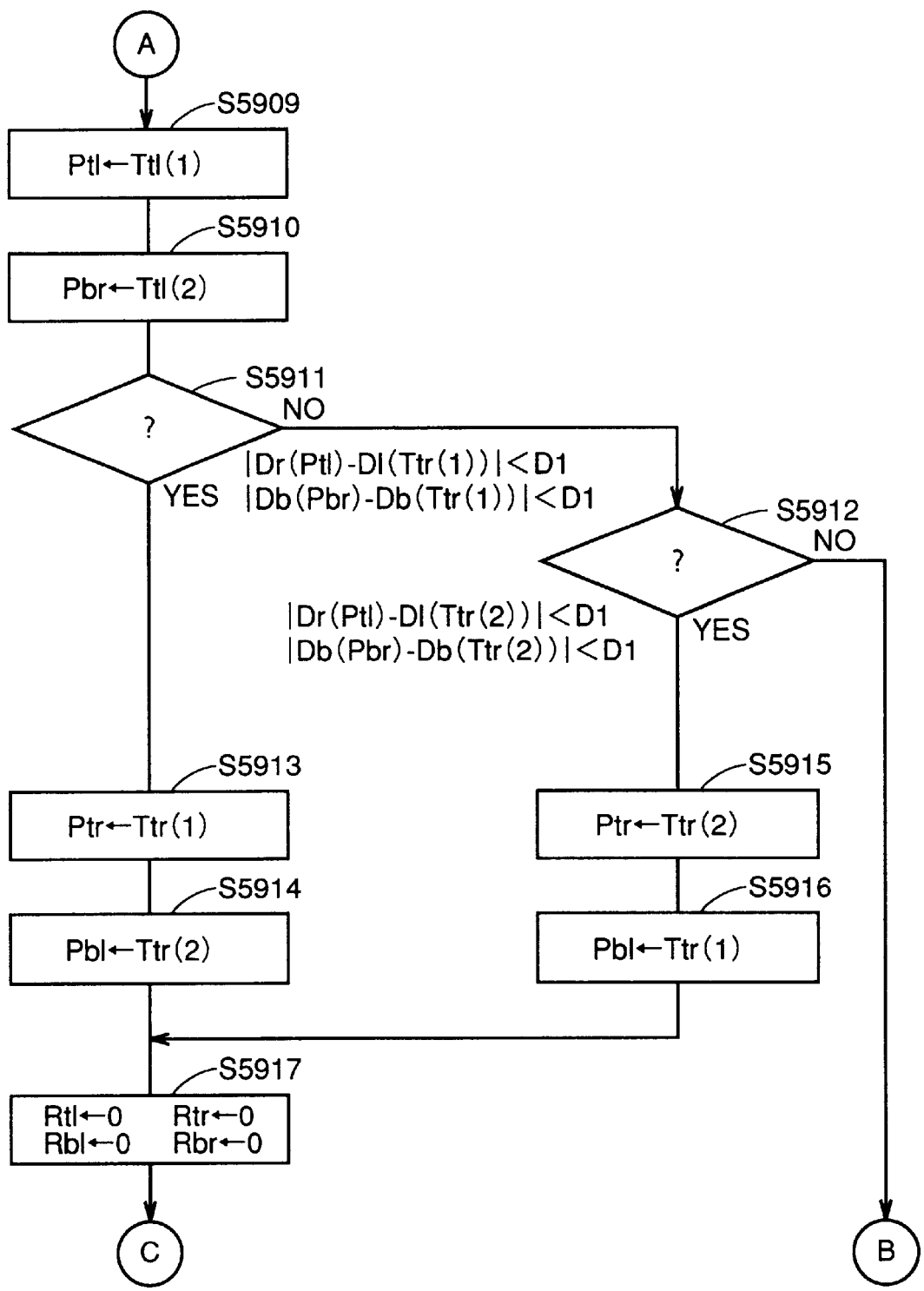
FIG. 38 is a flow chart for use in illustration of the remaining part of details of the relative position determining processing in FIG. 35.

Then, the image type classification processing is carried out (S56). The image type classification processing is the processing of detecting the image type of a partial image stored in image memory (n), a detail of which is shown in FIG. 36. The image type is classified based on if the partial image has spaces at its upper and left sides, its upper and right sides, at its lower and left sides, or its lower and right sides, in other words based on combinations of positions of spaces (see FIGS. 32 and 34), and the classification is carried out based on the image densities Dt(n), Db(n), Dl(n) and Dr(n) of the respective sides. Since n=1 for the first time, the image type of the partial image stored in image memory (1) is detected.

As shown in FIG. 36, in this image type classification processing, the image densities of the upper side and lower side are compared, the image densities of the left side and right side are compared, and it is determined if the strip-shaped portion of each side is a blank space based on a comparison with the prescribed threshold value DO. The image type is determined based on the combination of the blank spaces.

If, for example, the image density, of the upper side is smaller than the image density of the lower side (S5601; YES), and the image density of the upper side is smaller than threshold value DO (S5602; YES), the upper side is a blank space. If the image density of the left side is smaller than the image density of the right side (S5604; YES), and the image density of the left side is smaller than threshold value DO (S5605; YES), the left side is a blank space. If, therefore, the determination in step S5601 is "YES", in other words, the upper side and left side are determined to be blank spaces, "n" is set to variable Ttl(i) in order to indicate that the image type of the partial image stored in image memory (n) is the type of its upper side and lower side being blank spaces (S5601), and variable "i" indicating the number of the image type is incremented (S5610). The partial image stored in image memory (1) is thus set because "n=1" for the first time.

Similarly, if the image density of the upper side is smaller than the image density of the lower side (S5601; YES) and the image density of the upper side is smaller than threshold value DO (S5602; YES), the upper side is a blank space. If the image density of the right side is higher than the image density of the left side (S5604; NO), and the image density of the right side is smaller than threshold value DO (S5605; YES), the right side is a blank space. If, therefore, the determination in step S5606 is "YES", in other words, the upper side and the lower side are determined to be blank spaces, "n" is set to variable Ttr (j) in order to indicate the image type of the partial image stored in image memory (n) is the type of the upper side and right side being blank spaces, and variable (j) indicating the number of the image types is incremented (S5612). The partial image stored in image memory (1) is thus set, because "n=1" the first time.

Similarly, if the image density of the lower side is above the image density of the upper side (S5601; NO), and the image density of the lower side is smaller than threshold value DO (S5603; YES), the lower side is a blank space. If the image density of the left side is smaller than the image density of the right side (S5607; YES), and the image density of the left side is smaller than threshold value DO (S5608; YES), the left side is a blank space. If, therefore, the determination in step S5608 is "YES", in other words, the lower side and left side are determined to be blank spaces, "n" is set to variable Tbl (k) in order to indicate the image type of the partial image stored in image memory (n) is the type of the lower side and left side being blank spaces, and variable "k" indicating the number of the image type is incremented (S5614). Note that the partial image stored in image memory (1) is thus set, because "n=1" the first time.

Similarly, if the image density of the lower side is higher than the image density of the upper side (S5601; NO), and the image density of the lower side is smaller than threshold value DO (S5603; YES), the lower side is a blank space. If the image density of the right side is higher than the image density of the left side (S5607; NO), and the image density of the right side is smaller than threshold value DO (S5609; YES), the right side is a blank space. If, therefore, the determination in step S5609 is "YES", in other words, the lower side and right side are determined to be blank spaces, "n" is set to variable Tbr(m) in order to indicate the image type of the partial image stored in image memory (n) is the type of the lower side and right side being blank spaces (S5617), and variable "m" indicating the number of the image type is incremented (S5616). Note that the partial image stored in image memory (1) is thus set, because "n=1" the first time.

Note that besides the above cases, there is an error in detection of the image densities in step S55, or the document is other than those to be dealt with the apparatus (e.g., a document without surrounding spaces), and therefore error indication is made (S5618). The indication is for example "AUTOMATIC JOINING NOT POSSIBLE. START ALL OVER".

Once the above-described processing to the first partial image read first and stored in image memory (1) completes, variable n is incremented (S58), and then as with the first time, in response to turning on of start key 11 (S53; YES), for a second partial image, the processings including reading the partial image and storing it in image memory (2) (S54), detecting the image densities of the strip-shaped portions at surrounding four sides (S55), and classification of the image type (S56) are conducted, and the same procedure is repeated until the processing related to the fourth partial image completes.

Once the above-described processing with respect to the fourth partial image completes (S57; YES), the processing of determining relative positions (S59) is carried out. The processing of determining relative positions is the processing of determining if a partial image stored in each of image memories (1) to (4) is which one of partial images A to D, and determining if the image is in the correct direction or reverse direction from the top to the bottom in view of the operator.

First, it is determined if variables i,j, k and m indicating the number of each image type are all "1" (S5901). As shown in FIGS. 31a–31d, if the images are set in the corrected direction from the top to the bottom in view of the operator and read, all the four image types shown in FIGS. 32a–32d should exist. Meanwhile, if partial images A and B, and partial images C and D are set with their tops and bottoms reversed and read, the two types shown in FIGS. 34a–34d (the type of the upper side and left side being blank spaces, and the type of the upper side and right side being blank spaces) each correspond to two images. Taking advantage of the relation, it is determined if the document is read according to the method shown in FIGS. 31a–31d or according to the method in FIGS. 33a–33d (S5901).

If the variables i, j, k and m are all "1", in other words, the method shown in FIGS. 31a–31d is employed, the partial images are as shown in FIGS. 32a–32d. There is a one-to-one-correspondence between image types Ttl, Ttr, Tbl, and Tbr and the positions of partial images A, B, C and D. Therefore, Ttl(1), Ttr(1), Tbl(1), and Tbr(1) are set to variables Ptl, Ptr, Pbl, and Pbr representing the positions A, B, C, and D (S5904, S5905, S5906, and S5907). More specifically, respective data indicating the image memories which store partial images to be set at the positions A, B, C and D are set to variables Ptl, Ptr, Pbl, and Pbr.

If the document is read according to the method shown in FIGS. 31a–31d, it is not necessary to turn any of the partial images upon joining them. Therefore, variables Rtl, Rtr, Rbl, and Rbr indicating whether or not to turn the partial images at positions A, B, C, and D are each set to "0" (S5908). Note that the variable being "0" indicates that turning is not necessary, while "1" indicates the necessity of turning by 180°.

If it is determined to be "NO" in step S5901, the process proceeds to step S5902, and it is determined if variables I, J are "2", and variables k, m are "0", in other words, it is determined if the document is read according to the method shown in FIGS. 33a–33d. If the result shows that the variables I and J are "2", and variables k and m and "0" (S5902; YES), the partial images are as shown in FIGS. 34a–34d. In this case, the partial images with spaces at their upper sides and left sides are at positions A and D, while the partial images with spaces at their upper sides and right sides are at positions B and C. Therefore the positional relation between the four partial images cannot be determined in this state.

Among the two partial images with spaces at their upper sides and left sides, partial image Ttl(1) read early is set to variable Ptl indicating position A in the upper left (S5909), and partial image Ttl(2) read later is set to variable Pbr indicating position D in the lower right (S5910). After the setting, the positions of the remaining two partial images with spaces at their upper sides and right sides are determined based on the image densities of the adjacent portions of the partial images.

If, for example, among the remaining two partial images with the spaces at their upper sides and right sides, if partial image Ttr(1) read first is a partial image to be placed at position B, the image of the strip-shaped portion of width L1 at the left side of partial image Ttr(1) and the image of the strip-shaped portion of width L1 at the right side of partial image Ptl=Ttl(1) to be placed at position A should be similar to each other, and the difference between their image densities D1 (Ttr(1)) and Dr(Ptl) should be smaller than prescribed threshold value D1. Furthermore, the image of the strip-shaped portion of width L1 at the lower side of partial image Ttr(1) to be placed at position B and the image of the strip-shaped portion of width L1 at the upper side (the lower side in view of image data, because the partial images at the upper right and lower left are 180° reversed from each other in direction) of partial image Pbr=Ttl(2) to be placed at position D in the lower right are similar to each other, and the difference between these image densities Db(Ttr(1)) and Db(Pbr) should be smaller than threshold value D1. In step S5911, it is determined whether or not if this condition is satisfied, and the result of "YES" proceeds the procedure to steps S5913 and S5914. More specifically, variable Ptr indicating position B is set to Ttry(1) (S5913), and variable Pbl indicating position C is set to Ttr(2) (S5914). Data indicating the image memories storing partial images to be placed at positions B and C are set to variables Ptr and Pbl indicating these positions.

Meanwhile, if the determination in step S5911 is "NO", the above assumption is wrong. Therefore, the process proceeds to step S5912, and this time, the image densities of in the vicinity of the boundary between adjacent partial images are determined, assuming that prior read partial image Ttr(1) is a partial image to be placed at position C, and partial image Ttr(2) read later is a partial image to be placed at position B. As a result, the image of the strip-shaped image portion of width L1 at the left side of later read partial image Ttr(2) and the image of the strip-shaped to portion of width L1 at the right side of partial image Ptl=Ttl(1) to be placed at the position A in the upper left are similar to each other, and the difference between their image densities Dl(Ttr(2)) and Dr(Ptl) is smaller than threshold value D1. The image of the strip-shaped portion of width L1 at the lower side of later read partial image Ttr(2) and the image of the strip-shaped portion of width L1 at the upper side (lower side in view of image data, because the directions of the partial images at the upper right and lower right are 180° reverse from each other), of partial image Pbr=Ttl(2) to be placed at position D are similar to each other, and the difference between these image densities Db(Ttr(2)) and Db(Pbr) is smaller than threshold value D1(S5912; YES). Variable Ptr indicating position B is set to Ttr(2) (S5915), and variable Pbl indicating position C is set to Ttr(1) (S5914). Data indicating the image memories storing the partial images to be placed at positions B and C are set to variables Ptr and Pbl indicating these positions.

The image memories storing the partial images to be placed at the positions are set, variables Rbl and Rbr indicating whether or not to turn by 180° the partial images at positions C and D are each set to "1" (S5917). Note that the partial images at the positions A and B do not have to be turned, and variables Rtl and Rtr indicating whether or not they should be turned are set to "0" (S5917).

Note that the case other than the above is a case with error in detection of the image densities in step S55, or a document other than those to be processed by the apparatus according to the present invention (ie., a document without any surrounding space,) an error indication is made (S5903). The error indication is, for example, "AUTOMATIC JOINING NOT POSSIBLE. START ALL OVER".

Once the relative position is determined, the partial images read out from image memories (1) to (4) are stored in determined positions (addresses) in image memory (5)

with or without rotation (S60). The process of transferring the image data is controlled by DMAC 66 which has data set by control portion 63 as described above. The image data stored in image memory (5) is output to external devices (such as printer and facsimile), and used for the process of image formation at these external devices (S61).

In the above examples, the image of size A1 is divided into 4 parts for reading and combined into size A3, the process is the same between the other sizes. Also as for 2 parts, 6 parts, 8 parts or the like, the technique of determining the position of placing partial images based on the detection of spaces may similarly be applied. Furthermore, as for 6 parts and 8 parts, in addition to the technique of determining the positions taking advantage of spaces, the method of specifying the direction of rotation taking advantage of the similarities between the image densities at border line portions may similarly be applied.

In the above examples, though the border portions of partial images are joined without overlap reading, if the portion is read twice, a joining line is produced by means of pattern matching or the like and one of the overlap portions is deleted along the joining line, the method of the present invention may similarly be applied.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus for joining first image data and second image data each having one portion overlapping with the other into single image data for output, comprising:

means for detecting discrepancies between the first image data in the overlapping portion and the second image data in the overlapping region;

means for setting a joining line through the overlapping region to join the first image data and the second image data so that the discrepancies between the first image data and the second image data on the joining line are minimized; and means for combining the first image data and the second image data according to the joining line.

2. The image processing apparatus as recited in claim 1, further comprising storage means for storing a plurality of joining line patterns, wherein said joining line setting means sets a joining line by selecting such a joining line pattern that the image density of the overlap portion on the joining line is minimized.

3. The image processing apparatus as recited in claim 2, wherein the plurality of joining line patterns are formed of different combinations of a plurality of segments in a longitudinal direction and a plurality of segments in a transverse direction.

4. The image processing apparatus as recited in claim 1, further comprising:

means for detecting whether or not the image of the overlap portion being a photograph image; and means for prohibiting joining if the overlap portion is a photograph image.

5. An image processing apparatus for joining first image data and second image data each having one portion overlapping with the other into single image data for output, comprising:

means for comparing the density of the overlap portion of the first image data and the density of the overlap portion of the second image data, and detecting a density difference between the data of the overlap portions;

means for setting a joining line to join the first image data and the second image data so that the density difference between the images of the overlap portions on the joining line is minimized; and means for combining the first image data and the second image data according to the joining line.

6. The image processing apparatus as recited in claim 5, further comprising storage means for storing a plurality of joining line patterns, wherein said joining line setting means sets a joining line by selecting such a joining line pattern that the density difference between the image of the overlap portions on the joining line is minimized.

7. The image processing apparatus as recited in claim 6, wherein a plurality of joining line patterns are formed of different combinations of a plurality of segments in a longitudinal direction and a plurality of segments in a transverse direction.

8. The image processing apparatus as recited in claim 5, further comprising:

means for detecting whether or not the image of the overlap portion being a photograph image; and means for prohibiting joining if the overlap portion is a photograph image.

9. A method of processing an image by joining first image data and second image data each having one portion overlapping with the other into single image data for output, comprising:

a first reading step of reading a part of a document and outputting first image data;

a second reading step of reading another part of the document so that that another part of the document has a portion overlapping with the part of document read in the first reading step;

the step of detecting a density difference between the density of the overlap portion of the first image data and the density of the overlap portion of the second image data;

the step of setting a joining line to join the first image data and the second image data so that the density difference between the images of the overlap portions on the joining line is minimized; and the step of joining the first image data and the second image data according to the set joining line.

10. The image processing apparatus as recited in claim 9, further comprising the steps of:

detecting whether or not the image of the overlap portion being a photograph image; and prohibiting joining if the overlap portion is a photograph image.

* * * * *